US012413986B2

(12) United States Patent
Singh et al.

(10) Patent No.: US 12,413,986 B2
(45) Date of Patent: Sep. 9, 2025

(54) RADIO RESOURCE MODEL MANAGEMENT IN A WIRELESS NETWORK

(71) Applicant: Intel Corporation, Santa Clara, CA (US)

(72) Inventors: Vaibhav Singh, Delhi (IN); Christian Maciocco, Portland, OR (US); Maruti Gupta Hyde, Portland, OR (US); Nageen Himayat, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 749 days.

(21) Appl. No.: 17/558,618

(22) Filed: Dec. 22, 2021

(65) Prior Publication Data

US 2023/0199519 A1 Jun. 22, 2023

(51) Int. Cl.
*H04W 24/02* (2009.01)
*H04W 16/22* (2009.01)
*H04W 28/16* (2009.01)

(52) U.S. Cl.
CPC .......... *H04W 24/02* (2013.01); *H04W 16/22* (2013.01); *H04W 28/16* (2013.01)

(58) Field of Classification Search
CPC ...... H04W 24/02; H04W 16/22; H04W 28/16
USPC ........................................................ 455/414
See application file for complete search history.

(56) References Cited

U.S. PATENT DOCUMENTS

| | | | | |
|---|---|---|---|---|
| 10,719,498 B2* | 7/2020 | Darcy | ................... | G06F 16/214 |
| 11,075,805 B1* | 7/2021 | A | ........................ | H04L 41/0806 |
| 11,582,757 B2* | 2/2023 | Cui | ........................ | H04W 72/53 |
| 11,696,155 B2* | 7/2023 | Cioffi | ..................... | H04W 28/16 |
| | | | | 455/446 |
| 11,700,602 B2* | 7/2023 | Eyuboglu | ................ | H04B 7/04 |
| | | | | 370/336 |
| 11,871,240 B2* | 1/2024 | Gupta | ................. | G06Q 10/0833 |
| 11,889,492 B2* | 1/2024 | Hmimy | ................ | H04B 7/0695 |
| 11,943,801 B2* | 3/2024 | Iovanna | ............. | H04L 41/5051 |
| 11,974,269 B2* | 4/2024 | Barabell | ............. | H04W 84/047 |
| 2008/0008188 A1* | 1/2008 | Buga | ..................... | H04L 41/046 |
| | | | | 370/395.21 |
| 2013/0286851 A1* | 10/2013 | Moser | .................... | H04W 88/10 |
| | | | | 370/241.1 |
| 2014/0094186 A1* | 4/2014 | Barberis | ............... | H04W 52/00 |
| | | | | 455/453 |
| 2016/0242194 A1* | 8/2016 | Mitola | .................. | H04L 5/0037 |
| 2018/0332442 A1* | 11/2018 | Shaw | .................... | H04W 36/06 |
| 2019/0319868 A1* | 10/2019 | Svennebring | ....... | H04L 43/0882 |
| 2020/0007414 A1* | 1/2020 | Smith | ..................... | H04L 67/12 |

(Continued)

FOREIGN PATENT DOCUMENTS

| | | | | |
|---|---|---|---|---|
| JP | 4696161 B2 * | 6/2011 | ............ | H04W 28/18 |
| WO | WO-2007140337 A2 * | 12/2007 | ........... | H04L 41/046 |

(Continued)

*Primary Examiner* — Mahendra R Patel
(74) *Attorney, Agent, or Firm* — Viering, Jentschura & Partner mbB

(57) ABSTRACT

The present disclosure relates to a system for use in a wireless network, the system including: a processor configured to determine a performance parameter representative of a performance of a model of radio resource management, the model operating on a radio access network environment; and a radio resource manager configured to perform radio resource management dependent on the performance parameter.

16 Claims, 9 Drawing Sheets

(56) References Cited

U.S. PATENT DOCUMENTS

| | | | |
|---|---|---|---|
| 2021/0142257 A1* | 5/2021 | Stephens | G06Q 10/0637 |
| 2021/0400678 A1* | 12/2021 | Iovanna | H04L 43/0817 |
| 2021/0400765 A1* | 12/2021 | Bedekar | H04W 76/27 |
| 2022/0038902 A1* | 2/2022 | Mueck | H04L 63/1433 |
| 2022/0124723 A1* | 4/2022 | Li | H04W 72/542 |
| 2022/0345863 A1* | 10/2022 | Mueck | H04W 4/50 |
| 2023/0072769 A1* | 3/2023 | Yeh | H04W 28/0858 |
| 2023/0189319 A1* | 6/2023 | Akdeniz | G06N 3/084 |
| | | | 370/329 |

FOREIGN PATENT DOCUMENTS

| | | | | |
|---|---|---|---|---|
| WO | WO-2012037637 A1 * | 3/2012 | | H04B 7/26 |
| WO | WO-2013057315 A2 * | 4/2013 | | H04L 47/80 |
| WO | WO-2021146029 A1 * | 7/2021 | | H04L 49/70 |
| WO | WO-2022040655 A1 * | 2/2022 | | G06N 3/045 |

* cited by examiner

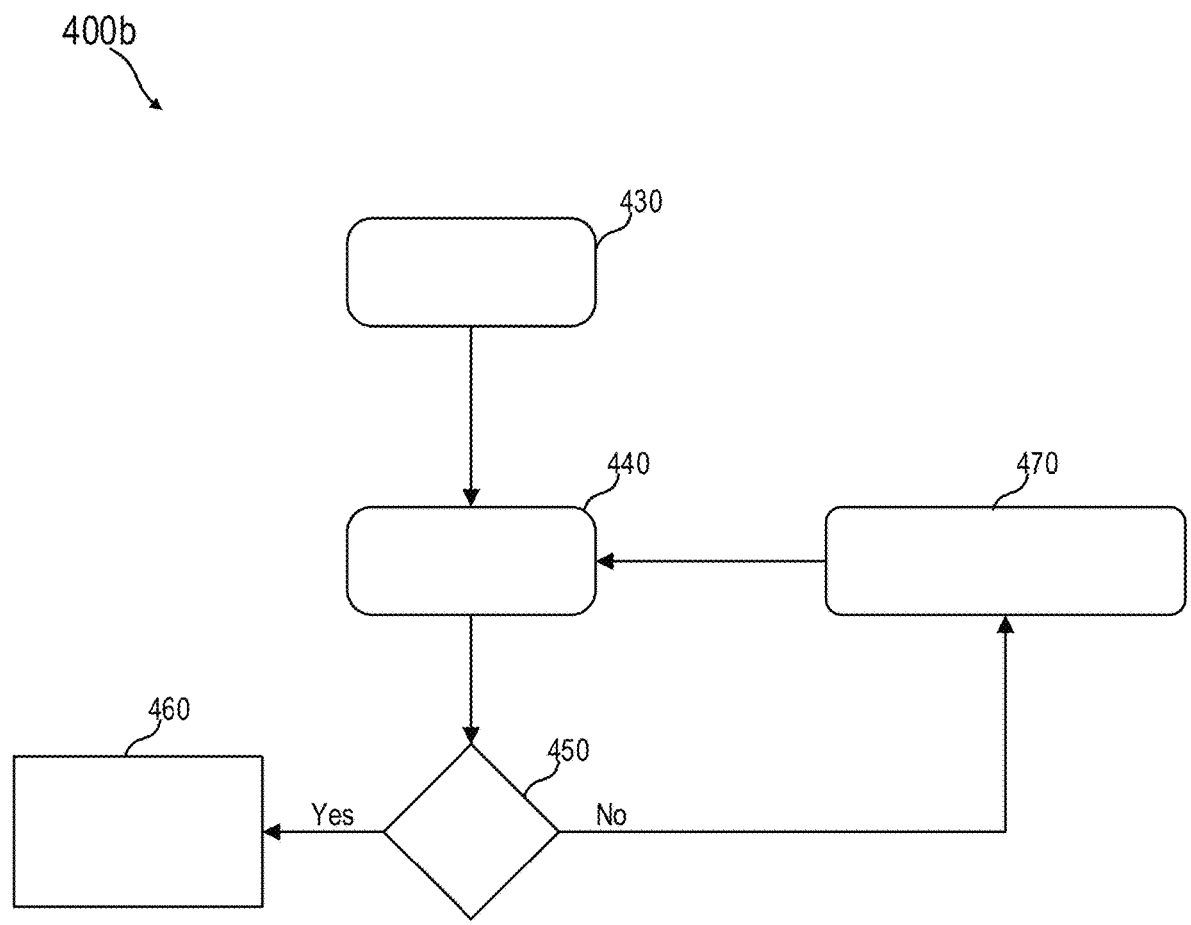

RADIO RESOURCE MODEL MANAGEMENT IN A WIRELESS NETWORK

TECHNICAL FIELD

The present disclosure relates to a system for use in a wireless network and methods thereof (e.g., a method of operating a wireless network, e.g. a method of performing radio resource management in a wireless network).

BACKGROUND

In general, various technologies and standards have been developed for wireless communication, which is at the basis of a variety of services and applications in everyday life, such as the consumption of entertainment content via streaming services, the implementation of automated driving functionalities via exchange of information with a road infrastructure, or the design of Internet of Things environments in an industrial or in a home setting, as examples. Software and hardware components of wireless networks are continuously evolving to satisfy the ever increasing number of connected users, and to ensure a fast and efficient transfer of information to and from the users. An important aspect of the operation of a wireless network is the management of radio resources. With the increasing data traffic and connections, radio resource management is a challenging optimization task aimed at optimizing the performance at network-level and user-level by acting, for example, on power control, admission control, load control, and packet scheduling functionalities. The development of advanced strategies for performing radio resource management in a wireless network is thus of fundamental importance for the development of wireless communications.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIG. 4A and FIG. 4B each shows a flow diagram of an exemplary method of performing radio resource management in a wireless network in a schematic representation according to the present disclosure.

DESCRIPTION

Figure 1A:
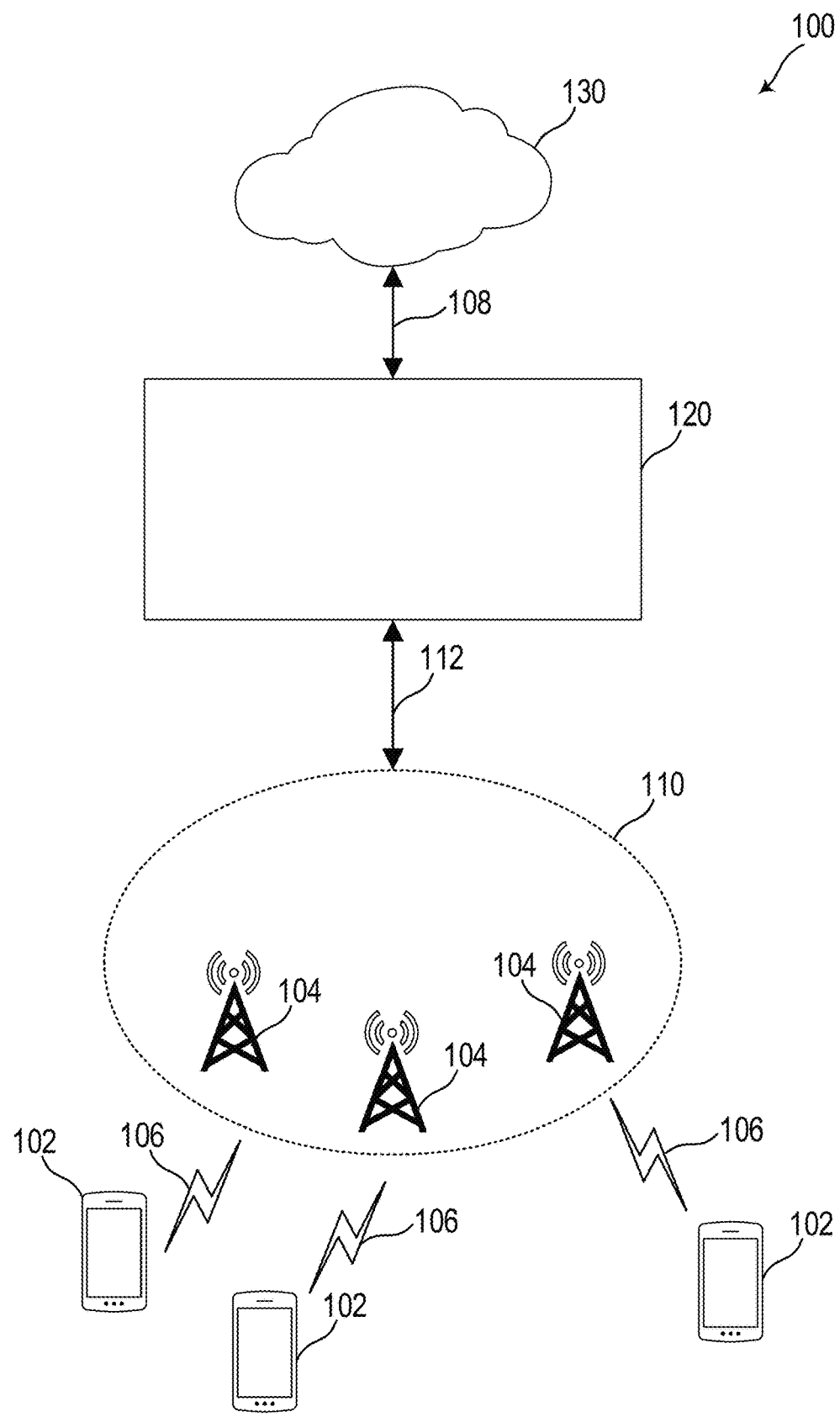
FIG. 1A shows an exemplary wireless network in a schematic representation according to the present disclosure.

The following detailed description refers to the accompanying drawings that show, by way of illustration, specific details and aspects in which the invention may be practiced. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects may be combined with one or more other aspects to form new aspects. Various aspects are described in connection with methods and various aspects are described in connection with devices (e.g., a system for use in a wireless network, a radio resource manager, a network access node, etc.). However, it may be understood that aspects described in connection with methods may similarly apply to the devices, and vice versa.

With the advancements of new generations of wireless networks (e.g., 5G and beyond), there is a constant demand for improvements in the operation of the network, both for the network-side as well as for the user-side. For example, the vision behind the 5th Generation of wireless networks aims at providing seamless wide-area coverage and high-capacity hot spots, while ensuring low latency and high reliability, and with low power consumption. However, providing services to the ever increasing number of users is a non-trivial task, in view of the limitations associated with power transmission (e.g., interference constraints, health considerations, cost, hardware limitations, etc.), and in view of the challenges posed by the use of the available radio spectrum, which is an intrinsically scarce resource.

In this context, radio resource management (RRM) describes the management of network resources (e.g., in terms of power allocation, channel usage, modulation, etc.) with the goal of optimizing the performance of the wireless network, e.g. in terms of power consumption, throughput, minimum data rate, etc. Several models (e.g., based on machine learning (ML) and artificial intelligence (AI)) have been developed for radio resource management in wireless networks, e.g. to determine which radio resource management configuration to apply in a given network scenario. For example, common and possibly central AI/ML modules may serve different RRM algorithms, such as, Load Prediction, Spectral efficiency prediction, Traffic prediction etc.

With exposure to large amounts of data (e.g., Terabytes of data) from the multiple cells of the wireless network, different model-based RRM algorithms (e.g., AI/ML RRM algorithms) may be configured to learn the user/traffic/mobility etc. patterns to optimize operation of a radio access network of the wireless network. Examples of model-based RRM algorithms include Load balancing, CQI (Channel Quality Indicator) period optimization, connectivity optimization, Cell Switch-on/off, and the like. The models for the different RRM algorithms and corresponding common modules are usually, constantly updated using training on the data from multiple cells in the network. However, such models (e.g., AI/ML models) are complex and require high platform compute, hence heat, energy consumption, for training as well as for the inference phase.

The present disclosure may be based on the realization that models for radio resource management are conventionally deployed in a static manner, e.g. once put into operation (e.g., at a cell or at a network access node of the wireless network) a model may be always running (for training and inference). However, there may be scenarios in which the model does not provide performance gain (e.g., in a cell at a particular time, for example), so that the conventional static use for which a model is nevertheless running leads to unnecessary computations, and thus to unnecessary heating, power consumption, etc.

The present disclosure is related to a dynamic use of models for radio resource management, which takes into account the performance benefit that a model may provide in a given network scenario to determine whether using that model may improve the performance in that network scenario. The strategy described herein may include determining (e.g., calculating, estimating, or forecasting) a performance benefit that a model of radio resource management may provide, and making a decision on the use of the model based on the determined performance benefit. As an example, there may be scenarios in which low complexity heuristics/models may be available as an alternative to highly complex (e.g., AI/ML) models, and the dynamic approach described herein may provide switching from a complex model to a simpler model if the network scenario allows it, thus saving computational power. The dynamic approach described herein provides thus an improved use of computational resources.

The present disclosure relates to a system for dynamic radio resource management in a wireless network. Illustratively, the present disclosure relates to a (computer-implemented) method of performing dynamic radio resource management in a wireless network.

The present disclosure relates to a system for use in a wireless network, the system including: a processor configured to determine (e.g., calculate, estimate, or forecast) a performance parameter representative of a performance of a model of radio resource management, the model operating on a radio access network environment; and a radio resource manager configured to perform radio resource management dependent on the performance parameter.

The performance parameter may be representative of the performance of the model of radio resource management in the radio access network environment, e.g., the performance parameter may be representative of how effectively and/or how accurately radio resource management may be modelled (and then carried out) using the model of radio resource management in the radio access network environment. As an example, the performance parameter may be representative of a forecast (e.g., estimated or predicted) performance of the model of radio resource management in the radio access network environment. The performance parameter may be representative of a (e.g., forecast) performance benefit associated with performing radio resource management using the model (illustratively, using the model to determine a configuration of radio resource management, and using the determined configuration to perform radio resource management). Stated in a different fashion, the performance parameter may be representative of a performance of radio resource management using the model of radio resource management in the radio access network environment (e.g., may be representative of a performance benefit associated with radio resource management using the model in the given radio access network environment).

As an exemplary configuration, the performance parameter may be representative of a difference between the performance of the model of radio resource management in the given radio access network environment with respect to a predetermined performance (in other words, a predefined performance) of the model of radio resource management. Illustratively, the performance parameter may be representative of the performance of the model (e.g., the forecast performance, e.g. the predicted or estimated performance) in the actual radio access network environment with respect to a predefined (e.g., ideal) performance of the model in a predefined radio access network environment. The predefined radio access network environment may be, for example, the radio access network environment for which the model has been designed, e.g. an environment with one or more properties (e.g., load, number of users, uplink/downlink requirements, etc.) for which the model parameters have been adjusted.

A "performance benefit" may include an improvement in the performance of the wireless network, e.g. in terms of throughput, power consumption, use of computational resources, latency, etc. As examples, a "performance benefit" may include an increase in the throughput of communication at the wireless network (e.g., at a network access node of the wireless network), a decrease in power consumption at the wireless network (e.g., at the network access node), a decrease in latency of communication at the wireless network, a decrease in interference of communication at the wireless network, and/or the like. A "performance benefit" may also be referred to herein as "performance gain" or "performance improvement".

The radio resource management described herein may thus be based on determining (e.g., calculating, estimating, or forecasting) how a model of radio resource management may or will perform in a given network scenario, to allow adapting the radio resource management strategy, e.g. to save computational power in case a complex model is not expected to provide performance improvements in a certain situation.

The present disclosure further relates to a method of performing radio resource management in a wireless network, the method including: determining (e.g., calculating, estimating, or forecasting) a performance parameter representative of a performance of a model of radio resource management, the model operating on a radio access network environment; and performing radio resource management dependent on the performance parameter.

The present disclosure further relates to a device for use in a wireless network, the device including: a processor configured to: determine a performance parameter representative of a performance (e.g., a forecast performance) of a model of radio resource management, the model operating on a radio access network environment; and instruct a radio resource management dependent on the determined performance parameter.

The present disclosure further relates to a radio resource manager for use in a wireless network, the radio resource manager including: a processor configured to: receive an instruction associated with a performance parameter representative of a performance (e.g., a forecast performance) of a model of radio resource management, the model operating on a radio access network environment; and perform radio resource management dependent on the received performance parameter.

The term "wireless network" as used herein, e.g. in reference to a communication network such as a mobile communication network, encompasses both an access section of a network (e.g., a radio access network (RAN) section) and a core section of a network (e.g., a core network section). A wireless network may provide communication and other types of services to one or more wireless communication devices, e.g. through network access nodes.

A wireless network may be or may include a communication network in which the final communication link (e.g., to a wireless communication device) is wireless, e.g. over an air interface. In a given location one or more wireless networks may be deployed, each supporting a radio access technology (RAT) and operating in a respective frequency range. A "wireless network" may also be referred to herein as "radio communication network" or "wireless system".

The term "network access node" as used herein refers to a network-side device that provides an access network (e.g., a radio access network). A "network access node" may allow wireless communication devices to connect and exchange information with a core network and/or external data networks through the network access node. A "network access node" may thus be or include any device that may be configured to allow a wireless communication device to access a wireless network. A "network access node" may provide coverage for a macro cell, a micro cell, a pico cell, a femto cell, and/or another type of cell of the wireless network. A "network access node" may include any type of base station or access point, including macro base stations, micro base stations, NodeBs, evolved NodeBs (eNBs), New Radio NodeBs (gNBs), Home base stations, Remote Radio Heads (RRHs), relay points, Wi-Fi/WLAN Access Points (APs), Bluetooth master devices, dedicated short-range communication roadside units (DSRC RSUs), wireless communication devices acting as network access nodes, multi-standard radio (MSR) equipment, and any other electronic device capable of network-side wireless communications, including both immobile and mobile devices (e.g., vehicular network access nodes, moving cells, and other movable network access nodes). A network access node may include any suitable combination of hardware and/or software to perform the tasks, features, functions and methods disclosed herein. A "network access node" may also be referred to herein as "RAN node", or simply as "network node".

The term "wireless communication device" as used herein refers to user-side devices (both portable and fixed) that may connect to a core network and/or external data networks via an access network, e.g. through a network access node. A "wireless communication device" may be configured to communicate wirelessly with other wireless communication devices and/or with a network access node of a wireless network. A wireless communication device may communicate with a network access node via downlink and uplink. "Downlink" may describe the communication link from the network access node to the wireless communication device, and "uplink" may describe the communication link from the wireless communication device to the network access node.

A "wireless communication device" may be or may include any mobile or immobile wireless communication device, including User Equipment (UEs), Mobile Stations (MSs), Stations (STAs), cellular phones, gaming consoles, tablets, laptops, personal computers, wearables, multimedia playback and other handheld or body-mounted electronic devices, consumer/home/office/commercial appliances (e.g., a smart television, a smart refrigerator, etc., in an Internet of Things implementation), vehicles (e.g., a car, or a drone), a robot, and any other electronic device capable of user-side wireless communications. Without loss of generality, in some cases wireless communication devices may also include application-layer components, such as application processors or other general processing components that are directed to functionality other than wireless communications. A wireless communication device may optionally support wired communications in addition to wireless communications. Furthermore, wireless communication devices may include vehicular communication devices that function as wireless communication devices. Certain communication devices may act both as wireless communication devices and network access nodes, such as a wireless communication device that provides network connectivity for other wireless communication devices. A "wireless communication device" may also be referred to herein as "terminal device" (to indicate that the wireless communication device represents the end terminal of a wireless connection), or simply as "wireless device".

The term "user" may be used herein in general to indicate a user of a wireless network, e.g. to indicate a "user of a wireless communication device" or to indicate a wireless communication device itself communicating or attempting to communicate with the wireless network. Illustratively, a "user" in the context of a wireless network may be understood as an entity that may access the wireless network and communicate via the wireless network. A "user" may be, for example, a person, e.g. the owner of a mobile phone, a smartphone, a tablet, etc. A user may however also be a technological entity, e.g. a wireless communication device itself, for example a robot, a smart sensor, a vehicle, etc. that may access the wireless network and communicate via the wireless network independently of the presence of a human operating or otherwise controlling the technological entity.

The term "radio resource management" may be used herein as commonly understood in the art, to describe the system-level management of network resources, e.g. management of transmit power, user allocation, handover, modulation, and the like. In general "radio resource management" may include the allocation of resources to users and management of co-channel interference. "Radio resource management" may include various radio resource management operations to adjust wireless communication to adapt to variations in the network environment, e.g. to deal with an increased number of users, to deal with varying data rate requirements of the users, etc. Illustratively, "radio resource management" may be a multi-dimensional optimization problem acting on various entities and/or parameters of a wireless network, such as antennas, power, time slots, frequency, base stations, etc. with the aim of improving the overall performance for the network and the users, e.g. in terms of interference, fairness, latency, throughput, etc.

The term "model" used herein may be understood as any kind of algorithm, which provides output data based on input data provided to the model (e.g., any kind of algorithm generating or calculating output data based on input data). A computing system may execute a model to progressively improve performance of a specific task. In this context, a "model of radio resource management" as used herein may be a (e.g., mathematical) model providing output data representative of a radio resource management configuration to apply based on the input data. Illustratively, a "model of radio resource management" may receive input data describing a network environment, and may provide output data representative of a resource management configuration. A model of radio resource management may be configured to determine how to manage radio resources based on the input data, e.g. based on the network scenario. As an example, the input data may be representative of how many wireless communication devices are communicating with the wireless network (e.g., how many wireless communication devices are served by a network access node), of bandwidth requirements in uplink and/or downlink of the wireless communication devices, of latency requirements of the wireless communication devices, etc. The model may be configured to provide output data that represent a resource management configuration to apply according to the input data, e.g. one or more radio resource management operations to perform in that network environment. A "model of radio resource management" may also be referred to herein as "model for radio resource management".

A "model" may be, for example, a "machine learning model", e.g. a model of radio resource management may be a machine learning model of radio resource management. A machine leaning model may be a model trained to recognize patterns in data (illustratively, in observations). Parameters of a machine learning model may be adjusted during a training phase based on training data. A trained machine learning model may be used during an inference phase to make estimations or decisions based on input data. In some aspects, the trained machine learning model may be used to generate additional training data. An additional machine learning model may be adjusted during a second training phase based on the generated additional training data. A trained additional machine learning model may be used during an inference phase to make estimations or decisions based on input data. A "machine learning" model may provide an "artificial intelligence" for carrying out a task modelled using the machine learning model.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to estimate the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive feedback (also referred to as reward) or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

A machine learning model described herein may be or may include a neural network. The neural network may be any kind of neural network, such as a convolutional neural network, an auto-encoder network, a variational auto-encoder network, a sparse auto-encoder network, a recurrent neural network, a de-convolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

The term "network environment" as used herein may describe a state of a wireless network, e.g. at a given time point, for example in relation to communication occurring over the wireless network. A "network environment" as used herein may refer to one or more properties of an operating scenario of the wireless network, e.g. to a number of users, downlink/uplink requirements of the users, data rate, and the like. A "network environment" as used herein may refer to an operating scenario of a cell, or a network access node, of the wireless network, as examples. A "network environment" may also be referred to herein as "network scenario". References to a "network environment" in the present disclosure may refer in particular to an environment of a "radio access network environment", e.g. to the environment of the "access network" portion of a wireless network.

In the context of the present disclosure it is understood that references to a wireless network, to radio resource management in a wireless network, and to determining (e.g., calculating, estimating or forecasting) the performance of a model of radio resource management, etc. may refer to a real-world scenario, i.e. to a wireless network existing in the real-world (illustratively, in the physical world) and to management of real-world resources. It is however understood that, in principle, the radio resource management strategy described herein could also apply to a virtual-world wireless network, illustratively to perform radio resource management of virtual resources in a virtual environment. A virtual-world wireless network may for example be or include a computer-implemented simulation of a wireless network, in which the components and the interactions of the virtual wireless network are computer-simulated to represent the corresponding real-world components and interactions of a corresponding real-world wireless network. A virtual-world wireless network may be part of a simulation environment, a video game, or a virtual reality implementation, as examples.

In the present disclosure, various aspects are described with terminology that may pertain to particular radio communication technologies, e.g. with terminology that may pertain to the 5G context. It is however understood that the aspects described herein may correspondingly apply to other radio communication technologies, in which same (e.g., structurally same and/or functionally same) components, structures, operations, logic entities, etc. may be referred to with other terms pertaining to the other radio communication technologies.

FIG. 1A shows an exemplary wireless network 100 in a schematic representation according to the present disclosure. The wireless network 100 may communicate with one or more wireless communication devices 102 via one or more network access nodes 104, e.g. over a physical interface 106 (e.g., an air interface). It is understood that the number of network access nodes 104 and wireless communication devices 102 in wireless network 100 is exemplary and is scalable to any amount.

The wireless network 100 may communicate with the one or more wireless communication devices 102 via various mechanisms. In an exemplary configuration, the wireless network 100 may be an ad-hoc network, which may be self-organizing, i.e., the ad-hoc network may be composed of devices that are not pre-configured to have certain roles. Any device may independently become part of wireless network 100, such as via self-configuration and/or registration with other devices. The ad-hoc network may include heterogeneous devices or homogenous devices. Homogeneous devices may all have the same properties, such as computational power, communication rate, communication technologies, etc. Heterogeneous devices on the other hand, may have varying properties.

In the following, the wireless network 100 will be described with particular reference to the cellular context. It is however understood that the description of the wireless network 100 may correspondingly apply to other configurations of the wireless network, e.g. in the case that the wireless network 100 is or includes a sound wave access network (with communication based on sound waves), or an optical access network (with communication based on visible or non-visible light). Furthermore, in the following some configurations of the wireless network 100 may be described in relation to particular radio access network contexts (e.g., 5G, O-RAN, etc.); it is however understood that the description of the wireless network 100 may correspondingly apply to other contexts and other types or configurations of a (radio) access network.

Considering the cellular context, the one or more wireless communication devices 102 may be or may include cellular terminal devices (e.g., Mobile Stations (MSs), User Equipment (UEs), or any type of cellular terminal device). The one or more network access nodes 104 may be or may include base stations (e.g., eNodeBs, NodeBs, gNodeBs, Base Transceiver Stations (BTSs), or any other type of base station). The one or more network access nodes 104 may be part of an access network 110 (e.g., a radio access network) of the wireless network 100. The access network 110 may be, for example, an Evolved Universal Mobile Telecommunications System (UMTS) Terrestrial Radio Access Network (E-UTRAN), a NextGen RAN (NG RAN), an O-RAN, a virtual RAN (vRAN), or some other type of RAN. The wireless network 100 may be a heterogeneous network including network access nodes 104 of different types, such as macro base stations, micro base stations, pico base stations, femto bases stations, etc. Considering an exemplary short-range context, as an alternative, the one or more network access nodes 104 may be or may include access points (APs, e.g., WLAN or WiFi APs), while the one or more wireless communication devices 102 may be or may include short range terminal devices (e.g., stations, STAs). In the short-range context, the one or more network access nodes 104 may interface (e.g., via an internal or external router) with one or more external data networks.

In accordance with some radio communication network technologies, the one or more wireless communication devices 102 may execute mobility procedures to connect to, disconnect from, and switch between available network access nodes 104 of the access network 110. Wireless communication devices 102 may be configured to select and re-select between the available network access nodes 104 in order to maintain a strong radio access connection with the access network 110.

Considering the cellular context, the wireless network 100 may further include a core network 120, with which the one or more network access nodes 104 may interface, e.g. via backhaul interfaces. The core network 120 may be or may include an Evolved Packet Core (EPC, for LTE), Core Network (CN, for UMTS), 5G core network (5GC), as examples, or other cellular core networks. The core network 120 may interface with one or more external data networks 130, e.g. via a suitable interface 108 (e.g., a N6 interface). The core network 120 may provide switching, routing, and transmission, for traffic data related to wireless communication devices 102, and may further provide access to various internal data networks (e.g., control nodes, routing nodes that transfer information between other wireless communication devices on wireless network 100, etc.) and external data networks 130 (e.g., data networks providing voice, text, multimedia (audio, video, image), and other Internet and application data). As an example, the one or more external data networks 130 may include one or more packet data networks, PDNs. A wireless communication device 102 may thus establish a data connection with external data networks 130 via a network access node 104 and core network 120 for data transfer and routing.

The access network 110 and core network 120 of wireless network 100 may be governed by communication protocols that can vary depending on the specifics of wireless network 100. Such communication protocols may define the scheduling, formatting, and routing of both user and control data traffic through wireless network 100, which includes the transmission and reception of such data through both the radio access and core network domains of wireless network 100. Accordingly, wireless communication devices 102 and network access nodes 104 may follow the defined communication protocols to transmit and receive data over the radio access network domain of wireless network 100, while the core network 120 may follow the defined communication protocols to route data within and outside of the core network 120. Exemplary communication protocols include LTE, UMTS, GSM, WiMAX, Bluetooth, WiFi, mmWave, etc., any of which may be applicable to wireless network 100.

Illustratively, the one or more network access nodes 104 (and, optionally, other network access nodes of wireless network 100 not explicitly shown in FIG. 1A) may accordingly provide a (radio) access network 110 to wireless communication devices 102 (and, optionally, other wireless communication devices of wireless network 100 not explicitly shown in FIG. 1A). In an exemplary cellular context, the (radio) access network provided by the one or more network access nodes 104 may enable the one or more wireless communication devices 102 to wirelessly access the core network 120 via radio communications.

The core network 120 may include one or more core network nodes (not shown in FIG. 1A) configured to implement various functionalities associated with the core network 120, depending on the radio communication technology context. As examples, the core network 120 may include one or more of: a network interface, a broadcast multicast service center (BM-SC), a mobility management entity (MME), a packet data network (PDN) gateway, a visitor location register (VLR), a multimedia broadcast multicast service (MBMS) gateway, a gateway mobile switching center (GMSC), an access and mobility management function (AMF), a session management function (SMF), a user plane function (UPF), a policy control function (PCF), a signaling gateway (SGW), a unified data management (UDM), a network slice selection function (NSSF), an authentication server function (AUSF), an application function, and/or the like.

The one or more network access nodes 104 may be configured to perform various functions of the access network 110, such as uplink and downlink management, data packet scheduling, radio network controller, ciphering and deciphering, handover, synchronization, and/or the like. The one or more network access nodes 104 may be communicatively coupled to the core network 120 via a suitable interface 112, e.g. a S1 interface (for example including a S1-U interface and a serving gateway, S-GW). The one or more network access nodes 104 may communicate with each other, e.g. directly or indirectly, via wired or wireless communication links. In an exemplary configuration, the access network 110 may be configured according to the Open Radio Access Network or Open RAN concept, as described in further detail in FIG. 1D.

In the following, in relation to FIG. 1B and FIG. 1C, exemplary configurations of a wireless communication device and a network access node will be described. In general, the configuration of a wireless communication device and/or a network access node for wireless communications may be known in the art. A brief description is provided herein to introduce a context for the present disclosure.

Figure 1B:
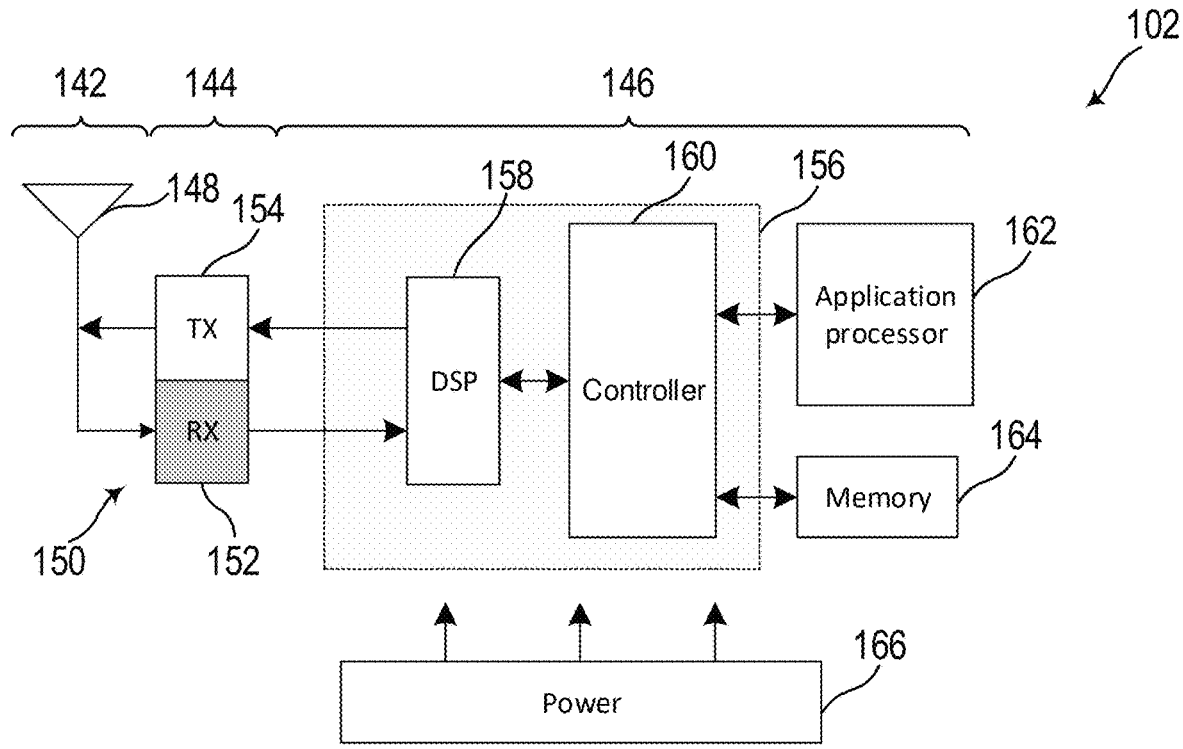
FIG. 1B shows an exemplary wireless communication device in a schematic representation according to the present disclosure.

FIG. 1B shows an exemplary wireless communication device 102 in a schematic representation according to the present disclosure. In general, a wireless communication device 102 may include an antenna system 142 (also referred to herein as antenna circuitry), transceiver system 144 (also referred to herein as transceiver circuitry), and a processing system 146 (also referred to herein as signal processing circuitry). In the following a description of exemplary components for the various sections 142, 144, 146 of the wireless communication device 102 will be provided.

It is understood that the configuration illustrated in FIG. 1B is exemplary, and a wireless communication device 102 may include additional, less, or alternative components with respect to those shown. As examples, the wireless communication device 102 may include one or more additional hardware and/or software components depending on its configuration and its intended use, such as processors/microprocessors, controllers/microcontrollers, other specialty or generic hardware/processors/circuits, peripheral device(s), power supply, external device interface(s), subscriber identity module(s) (SIMs), user input/output devices (display(s), keypad(s), touchscreen(s), speaker(s), external button(s), camera(s), microphone(s), etc.), or other related components.

Wireless communication device 102 may be configured to transmit and receive radio frequency signals via the antenna system 142, which may include one or more directional or omnidirectional antennas 148, e.g. a single antenna 148 or an antenna array that includes multiple antennas 148. The one or more antennas 148 may include, for example, dipole antennas, monopole antennas, patch antennas, loop antennas, microstrip antennas, or other types of antennas suitable for transmission of radio frequency signals. As an exemplary configuration, an antenna 148 may have multiple apertures, each of which may be considered as an antenna. In an exemplary configuration, the antenna system 142 may additionally include analog antenna combination and/or beamforming circuitry.

Transceiver system 144 may include a radio frequency (RF) transceiver 150, having a receive (RX) path 152 and a transmit (TX) path 154. The RF transceiver 150 may include analog and digital reception components including amplifiers (e.g., Low Noise Amplifiers (LNAs)), Power Amplifiers (PAS), filters, RF demodulators (e.g., RF IQ demodulators)), and analog-to-digital converters (ADCs), which RF transceiver 150 may utilize to convert radio frequency signals to digital baseband samples. In the receive (RX) path 152, the RF transceiver 150 may be configured to receive analog radio frequency signals from the antenna system 142 and perform analog and digital RF front-end processing on the analog radio frequency signals to produce digital baseband samples (e.g., In-Phase/Quadrature (IQ) samples). In the transmit (TX) path 154, the RF transceiver 150 may be configured to receive digital baseband samples from the processing system 146 (e.g., from a baseband modem 156 of the processing system 146) and perform analog and digital RF front-end processing on the digital baseband samples to produce analog radio frequency signals to provide to the antenna system 142 for wireless transmission. The RF transceiver 150 may thus also include analog and digital transmission components, which RF transceiver 150 may utilize to mix the digital baseband samples received from the processing system 146 and produce the analog radio frequency signals for wireless transmission by the antenna system 142.

The processing system 146 may be configured for transmission and reception processing. The processing system 146 may include, for example, a baseband modem 156 (e.g., including a digital signal processor 158 and a protocol controller 160), an application processor 162, a memory 164, and a power supply 166. The baseband modem 156 may be configured to direct the communication functionality of wireless communication device 102 according to the communication protocols associated with each (radio) access network, and may be configured to execute control over antenna system 142 and RF transceiver 154 to transmit and receive radio signals according to the formatting and scheduling parameters defined by each communication protocol.

The baseband modem 156 may include a digital signal processor 158, which may be configured to perform physical layer (PHY, Layer 1) transmission and reception processing to, in the transmit path 154, prepare outgoing transmit data, which the protocol controller 160 provides, for transmission via RF transceiver 150, and, in the receive path 152, prepare incoming received data, which the RF transceiver 150 provides, for processing by the protocol controller 160. Digital signal processor 158 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancellation, and any other physical layer processing functions.

The wireless communication device 102 may be configured to operate according to one or more radio communication technologies, and the digital signal processor 158 may be responsible for lower-layer processing functions (e.g., PHY, Layer 1) of the radio communication technologies, while the protocol controller 160 may be responsible for upper-layer protocol stack functions (e.g., Data Link Layer/Layer 2 and/or Network Layer/Layer 3). Protocol controller 160 may thus be responsible for controlling the radio communication components of wireless communication device 102 (antenna system 142, RF transceiver 150, and digital signal processor 158) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 160 may be configured to perform both user-plane and control-plane functions to facilitate the transfer of application layer data to and from radio wireless communication device 102 according to the specific protocols of the supported radio communication technology. User-plane functions may include header compression and encapsulation, security, error checking and correction, channel multiplexing, scheduling and priority, while control-plane functions may include setup and maintenance of radio bearers.

In an exemplary configuration, wireless communication device 102 may be configured to transmit and receive data according to multiple radio communication technologies. Accordingly, one or more of antenna system 142, RF transceiver 150, digital signal processor 158, and/or protocol controller 160 may include separate components or instances dedicated to different radio communication technologies and/or unified components that are shared between different radio communication technologies. Accordingly, while antenna system 142, RF transceiver 150, digital signal processor 158, and protocol controller 160 are shown as individual components in FIG. 1B, it is understood that they may encompass separate components dedicated to different radio communication technologies.

The processing system 146 may further include an application processor 162 (e.g., a CPU) and a memory 164. Application processor 162 may be configured to handle the layers above the protocol stack, including the transport and application layers. Application processor 162 may be configured to execute various applications and/or programs of wireless communication device 102 at an application layer of wireless communication device 102, such as an operating system (OS), a user interface (UI) for supporting user interaction, and/or various user applications. The application processor 162 may interface with baseband modem 156 and act as a source (in the transmit path) and a sink (in the receive path) for user data, such as voice data, audio/video/image data, messaging data, application data, basic Internet/web access data, etc. Memory 164 may embody a memory component of wireless communication device 102, such as a hard drive or another such permanent memory device. Although not explicitly depicted in FIG. 1B, the various other components of wireless communication device 102 may additionally each include integrated permanent and/or non-permanent memory components, such as for storing software program code, buffering data, etc.

Figure 1C:
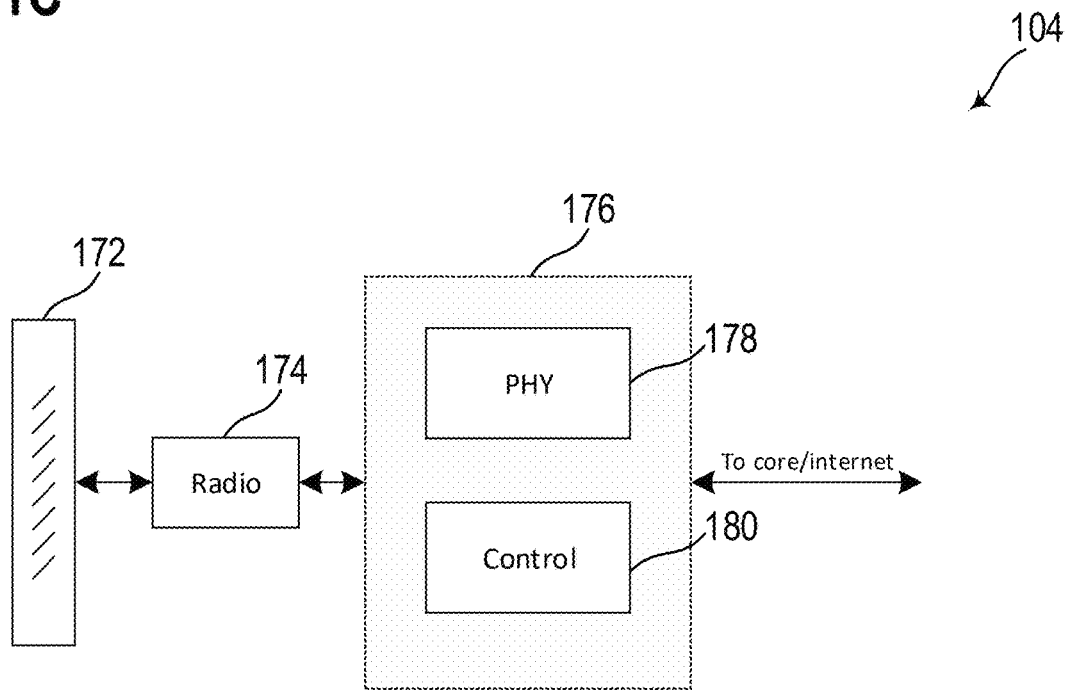
FIG. 1C shows an exemplary network access node in a schematic representation according to the present disclosure.

FIG. 1C shows an exemplary network access node 104 in a schematic representation according to the present disclosure. As an exemplary application scenario, a network access node 104 may be configured to provide LTE and/or 5G radio services. In general, the network access node 104 may include an antenna system 172 (also referred to herein as antenna circuitry), transceiver system 174 (also referred to herein as transceiver circuitry), and a baseband system 176 (e.g., including a physical layer processor 178 and a protocol controller 180)

In an abridged overview of the operation of network access node 104, network access node 104 may be configured to transmit and receive radio frequency signals via antenna system 172, which may be an antenna array including multiple antennas. Radio transceiver 174 may be configured to perform transmit and receive RF processing to convert outgoing baseband samples from baseband subsystem 176 into analog radio signals to provide to antenna system 172 for radio transmission, and may be configured to convert incoming analog radio signals received from antenna system 172 into baseband samples to provide to baseband subsystem 176. Physical layer processor 178 may be configured to perform transmit and receive PHY processing on baseband samples received from radio transceiver 174 to provide to controller 180, and may be configured to perform transmit and receive PHY processing on baseband samples received from controller 180 to provide to radio transceiver 174. Controller 180 may be configured to control the communication functionality of network access node 104 according to the corresponding radio communication technology protocols, which may include exercising control over antenna system 172, radio transceiver 174, and physical layer processor 178.

In an exemplary configuration, the network access node 104 may be configured to serve one or more wireless communication devices using beamforming techniques and/or coordinated spatial techniques, e.g. may be configured to transmit a beamformed signal to a wireless communication device in one or more directions.

Network access node 104 may thus be configured to provide the functionality of network access nodes in wireless networks by providing an access network to enable served wireless communication devices to access communication data. For example, network access node 104 may also interface with a core network, one or more other network access nodes, or various other data networks and servers via a wired or wireless backhaul interface.

Figure 1D:
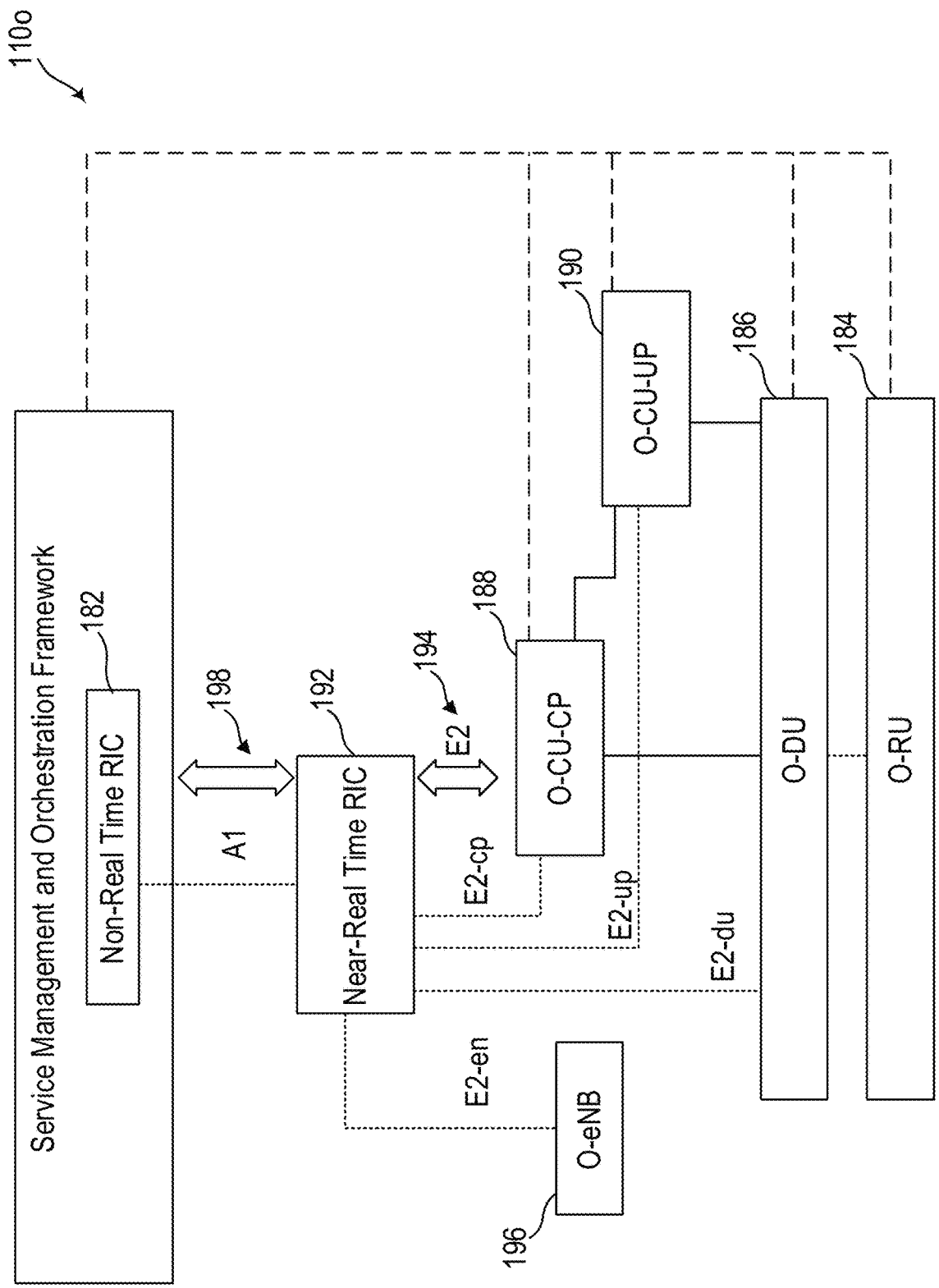
FIG. 1D shows an exemplary radio access network configured according to the O-RAN context in a schematic representation according to the present disclosure.

FIG. 1D shows an exemplary radio access network 1100 in a schematic representation according to the present disclosure. The radio access network 1100 may be an exemplary configuration of the access network 110 of wireless network 100. The radio access network 1100 may be a radio access network configured according to the ORAN concept (also referred to herein as Open RAN, or O-RAN), illustratively the radio access network 1100 may have an ORAN architecture. It is understood that the representation in FIG. 1D is exemplary, and an ORAN architecture 1100 may include additional, less, or alternative components with respect to those shown. The radio access network 1100 may include non-proprietary hardware and software components, based on open interfaces and standards. The configuration in FIG. 1D may illustrate a radio access network 1100 configured for 4G and 5G wireless communications, but it is understood that other configurations of the radio access network 1100 may be provided, e.g. to serve only one of 4G or 5G, or to serve other types of wireless communications.

Considering the Open-RAN concept, the radio access network 1100 may include a management-side and a radio-side. The management-side may be configured to implement management functions of the RAN. The management side (also referred to as service management and orchestration framework) may include a non-real time RAN intelligent controller 182 (non-real time RIC, non-RT RIC) configured to implement non-real time control of RAN components and resources. The non-real time RIC 182 may be configured to implement functionalities to support intelligent RAN optimization, such as service and policy management, configuration management, device management, fault management, performance management, and lifecycle management for the network elements. For example, the non-real time RIC 182 may use machine learning models to implement the various functionalities. The functionalities of the non-real time RIC 182 may have non-real time latency.

The radio-side of the radio access network 1100 may be configured to implement functions on a shorter time scale with respect to the management-side, e.g. functionalities with near-real time or real-time latency. The radio-side of the radio access network 1100 may include: a radio unit 184 (RU, or O-RU to describe the network function) configured to transmit, receive, amplify, and/or digitize radio frequency signals; and a baseband unit (BBU), which may include a distributed unit 186 (DU, or O-DU to describe the network function) configured to carry out baseband processing functions (e.g., in real time), and a centralized unit (CU, or O-CU to describe the network function) configured to carry out packet processing functions (e.g., on a longer time scale with respect to the distributed unit). The centralized unit may include a centralized unit for the control plane 188 (CU-CP, or O-CU-CP), and a centralized unit for the user plane 190 (CU-UP, or O-CU-UP). The distributed unit 186 may be configured to run the radio link control and medium access control (MAC) layers. The centralized unit may be configured to control the distributed unit, and to run radio resource control protocol. The interfaces between the various components (e.g., the RU, DU, CU) may be non-proprietary (illustratively, open), which may allow the DU and CU to be implemented as virtualized software functions, as an example. As an exemplary scenario, a distributed unit 186 may be implemented at a network access node 196 (or in general not at a core network location), whereas a centralized unit may be implemented at a network access node 196 or at a more central location in the network. A radio unit may be located near or integrated into an antenna of a network access node 196.

The distributed unit and the centralized unit may be logical nodes of the ORAN architecture, configured for the computations related to signal transmission and reception.

The radio-side may further include a near-real time RAN intelligent controller 192 (near-real time RIC, near-RT RIC) configured to carry out near-real time control of RAN components and resources. The near-real time RIC 192 may be configured to implement control of RAN components over a so-called E2 interface 194, e.g. providing an interface between the near-real time RIC 192 and the other components at the radio-side (e.g., there may be an E2 interface with the distributed unit 186, E2-du, and centralized unit 188, 190, E2-cp, E2-up). The near-real time RIC 192 may also be configured to receive data over the E2 interface 194, e.g. from a network access node 196 of the radio access network 1100. The E2 interface may provide a connection between near-real time RIC 192 and network access node 196, so that the near-real time RIC 192 may control one or more functions of the network access node 196. The network access node 196 may be an E2 node, also referred to as O-eNB (e.g., for the 4G context), or another type of network access node. The non-real time RIC 182 and the near-real time RIC 192 may be communicatively coupled with one another over an A1 interface 198. The A1 interface 198 may allow non-real time RIC 182 to provide information to near-real time RIC 192, such as model management information, enrichment information, and policy information.

The near-real time RIC 192 may provide a software environment for one or more software plug-ins, referred to as xAPP(s), which may be configured to instruct various functionalities of the near-real time RIC. A xAPP may be an application running in the near-real time RIC 192 for the management of resources and components of the radio access network 1100. Examples of xAPPs may include: connection management, mobility management, quality-of-service management, and/or interference management. A xAPP may receive near-real time information over the E2 interface 194. The near-real time RIC 192 may include or provide an interface for the xAPPs, e.g. an application programming interface (API), providing a path for exchange of information to and from the xAPPs.

The RAN intelligent controllers (e.g., the near-real time RIC 192 and non-real time RIC 182) may be functional components which may reside in various nodes and/or entities of a wireless network, for example on the host running the RAN software, in a networked device, or in the cloud assuming the respective latency can be met.

A further component of the ORAN architecture (not shown in FIG. 1D) that the radio access network 1100 may include is the so-called O-Cloud, which is a cloud computing platform for hosting and running various functionalities of the radio access network, such as functionalities of the RIC(s). The O-Cloud may include physical infrastructure nodes that may host O-RAN functions and software components for implementing the O-RAN functions, as known in the art.

With the development of ORAN standards, different functionalities of the radio access network may be optimized by pushing the logic to the Ran Intelligent Controller (RIC) to make more intelligent and data driven decisions. For example, radio resource management logic may be located partly or fully in near-real time RIC and/or in non-real time RIC, e.g. assuming that latency requirements may be satisfied. As an example, low latency logic may be mapped to near-real time RIC and longer latency logic to non-real time RIC.

In the ORAN context, radio resource management algorithms and models (e.g., AI/ML models) for single cells as well as for multiple cells may be trained on RAN data collected from single/multiple cells. As an exemplary configuration, the data may be collected in a centralized cloud entity of an ORAN, called O-Cloud. Models for radio resource management may be very complicated, for example may include multi-layered deep learning models with order of hundreds of inputs etc., that may require very resource-intensive computations, thus leading to heat dissipation due to computations, and to an overall high energy usage for training the model (offline/online) and for inference. The models for radio resource management may be hosted on the controller platform of the radio access network (e.g., in the RIC(s)) or inside the network access node (e.g., eNodeB, gNodeB). Thus, there may be a high power consumption and use of computational resources at the controller platform of a radio access network to implement reasonable working models (e.g., AI/ML models).

The present disclosure may be based on the realization that is resource-inefficient to keep models for radio resource management running (e.g., for training and/or inference) without considering whether the model may actually provide a performance benefit for the wireless network in a particular network scenario. Illustratively, radio resource management models and algorithms, e.g. based on computationally intensive AI/ML models, may not always provide performance benefit, e.g. for example for certain cells at different time/times of the day. This may be related, for example, to the fact that it may be very hard to predict/estimate different key performance indicators (KPIs) based on the characteristics of the RAN data for a particular cell or group of cells. The characteristics may include time series evolution of cell data and/or distribution of different cell KPIs, as examples. Therefore, model prediction may be error prone, and the model may be unable to provide the expected benefit in terms of performance. For example, a load prediction model based on the time series characteristics may not be able to predict the load reasonably well, and using erroneous estimate of the load may lead to performance degradation.

As a further consideration, the data KPIs, such as, for example, downlink physical resource block usage, uplink physical resource block usage, and the like, may lie in a particular regime or range where a certain model of radio resource management may not provide much benefit. For example, in the case of low load, a model for overload control may be not very beneficial. As another example, in case a model is designed to optimize downlink and uplink traffic tradeoff, uplink traffic may be very low, hence simple default heuristic to optimize downlink performance could work well (illustratively, better than a complex machine learning model).

However, in a conventional radio access network environment, models are deployed statically, so that a model of radio resource management is not pushed to sleep (or is replaced by a more computationally simple solution) even in case the model does not provide performance benefit. Thus, power is spent unnecessarily for no performance gains. This may be related to the fact that the current use of models for radio resource management is static, i.e. an operator statically decides a cell or a group of cells where the models may be used, without considering the possibility of dynamically adapting the use of the models. Illustratively, models for radio resource management used in RAN are deployed for a cell or group of cells, without forecasting their corresponding performance advantage.

The present disclosure may be related to a dynamic use of models of radio resource management in a wireless network, e.g. in an access network (for example in an ORAN). The approach described herein may be based on dynamically characterizing when and which model(s) for radio resource management may provide performance gains in a given situation, and then selecting accordingly which model(s) to use in that situation. For example, model computations may be pushed into sleep, or may be substituted with simple heuristics, in case the model computations are not improving performance. The approach described herein may include doing performance forecasting of models for radio resource management to select the most suitable model for a given scenario (e.g., the one with the greatest expected performance benefit). The dynamic approach described herein may thus provide pro-actively saving power and computational resources, e.g. on a controller platform, eNodeB, gNodeB, etc. As an exemplary scenario, in case an AI/ML model is found to be not useful in a given scenario, another simpler solution (e.g., based on simple heuristics) may be selected which is less resource-demanding. The approach described herein may thus improve the use of compute resources in the system, e.g. may enhance power saving while ensuring radio resource management in a RAN.

The unique characteristic of data from RAN, for example cell traffic volume, cell physical resource block (PRB) usage, number of users, performance indicators etc., is that it varies with time and space. This characteristic of RAN may be referred to herein as heterogeneous cell scenario, as each cell may have different environmental characteristics. For example, in a particular cell the PRB usage load may vary with time of the day and across multiple cells based on the location. For the majority of time, cell load may be low and at traffic peak times load may be high. Similarly, for cells in a particular region, for example cells near a stadium, during an actual game, the load may be high, while in the cells surrounding the stadium the load may be low. Based on the dynamic characteristics of the data, the performance benefit of the models (e.g., AI/ML models) may change with time, and this may be leveraged to push the module computation of the algorithm into sleep state (stall computation) by using a simple heuristic for the radio resource management (RRM) algorithm, so as to save power if there is hardly any benefit from using the compute intensive models. For example, if load prediction model performance is below threshold for a cell, it may be possible to switch to default simple heuristic of just using last load sample as future load estimate. For example, for cells located near a stadium simply taking into account the game schedule may provide a strong hint that outside of these games a simple heuristic may be sufficient. Thereby, saving heat due to computation, saving overall power by avoiding computations using the model, while using a reasonable load estimate.

The dynamic radio resource management described herein may be particularly well suited for applications in an ORAN context, in view of the flexibility that the dynamic approach provides. Thus, in the following the terminology used to describe components, parameters, logic entities, etc. may pertain to the ORAN context. It is however understood that the dynamic radio resource management described herein may be applied also to other radio access network types or configurations, and that the operations and configurations described herein may apply in a corresponding manner to components, parameters, logic entities, etc. pertaining to other radio access network types or configurations.

Figure 2A:
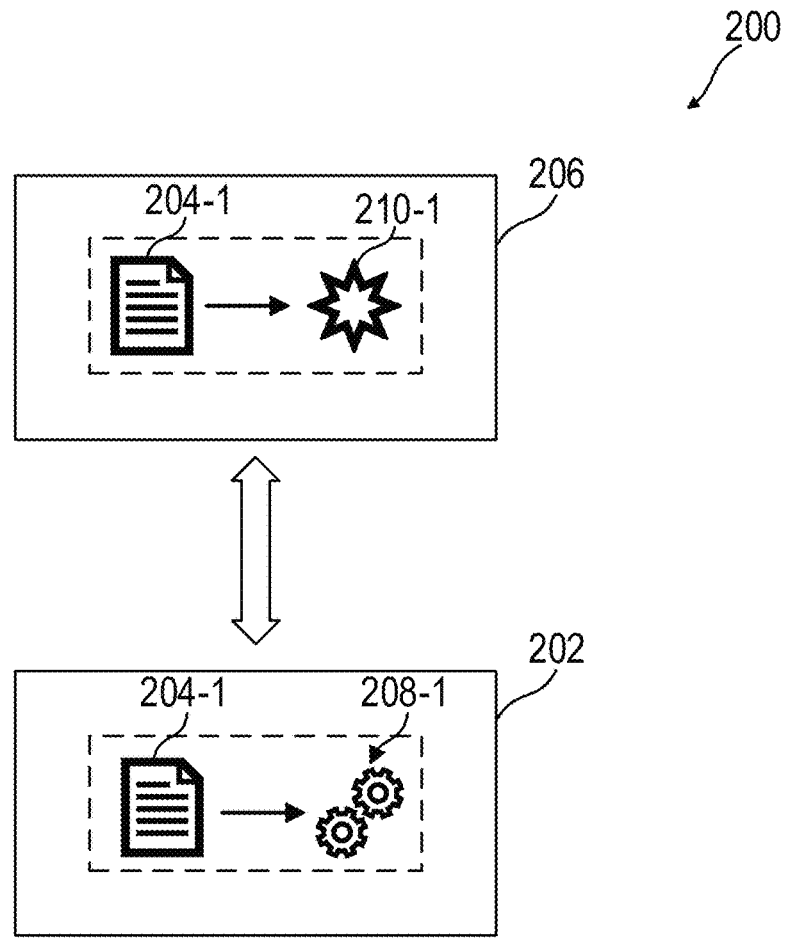
FIG. 2A shows an exemplary system for use in a wireless network in a schematic representation according to the present disclosure.

FIG. 2A shows an exemplary system 200 for use in a wireless network (e.g., in the wireless network 100, e.g. in a 5G wireless network) in a schematic representation according to the present disclosure. The system 200 may be configured to perform dynamic radio resource management in the wireless network. The system 200 may be configured to be deployed at various locations within the wireless network, e.g. within a radio access network, for example at a network access node (e.g., eNodeB, gNodeB) and/or at a controller of the wireless network (e.g., at a RAN intelligent controller, for example near-real time RIC or non-real time RIC). It is understood that the operation of the system 200 may be located in a single network entity, or may be distributed among more than one network entity, e.g. among a plurality of entities (e.g., nodes and/or units) present in the wireless network and/or communicatively coupled with the wireless network (e.g., in a cloud-environment). It is also understood that the representation of the system 200 may be simplified for the purpose of illustration, and the system 200 may include additional components with respect to those shown.

The system 200 may include a radio resource manager 202 configured to perform radio resource management, e.g. the radio resource manager 202 may be configured to control or instruct one or more other entities of the wireless network to manage the radio resources of the wireless network. The radio resource manager 202 may be configured to perform radio resource management according to one or more models (e.g., a first model 204-1) for radio resource management, as discussed in further detail below. As examples, the radio resource manager 202 may be configured to control or instruct one or more antennas, one or more transceivers, one or more modulators, etc. The radio resource manager 202 may include a processor, one or more communication interfaces, a memory, and the like to perform the operations described herein. As an example, the radio resource manager 202 may include a memory storing one or more models of radio resource management. The radio resource manager 202 may also be referred to herein as radio resource management (RRM) algorithm module.

The system 200 may further include a device 206 configured to assist the radio resource management at the radio resource manager 202 by determining a (e.g., forecast) performance benefit of a model of radio resource management (e.g., of the first model 204-1) in a radio access network environment. The device 206 may be referred to herein as performance forecasting and power saving module (PFPSM), or as performance forecasting and power saving (PFPS) device. The device 206 may include a processor, one or more communication interfaces, a memory, and the like to perform the operations described herein. As an example, the device 206 may include a memory storing instructions to operate the device 206 (e.g., to operate a processor of the device), for example the memory may store a model (e.g., a machine learning model) of determining a performance parameter of a model of radio resource management.

The radio resource manager 202 and the device 206 may be deployed at various locations within the wireless network. As an example, a network access node (e.g., the network access node 104, 196 described in relation to FIG. 1A to FIG. 1D, e.g. a network access node of an ORAN 1100) may include the radio resource manager 202 and/or the device 206. As another example, the functionalities of the radio resource manager 202 and/or the device 206 may be implemented in a radio access network intelligent controller (RIC) of the wireless network, e.g. of an ORAN, for example may be implemented in a near-real time radio access network intelligent controller or non-real time radio access network intelligent controller. An entity including the radio resource manager 202 and/or the device 206 may be understood, for example, as the operation described in relation to the radio resource manager 202 and/or the device 206 running at that entity (e.g., in a host, in a processor, or in a plurality of processors, at that entity). It is understood that the operation of the radio resource manager 202 and/or the device 206 may be located in a single network entity, or may be distributed among more than one network entity. It is also understood that the radio resource manager 202 and the device 206 (illustratively, the respective functionalities) may be implemented as separate entities or as a single entity. As an example, a xAPP for a near-real time RIC may be configured to instruct an operation corresponding to the operation of the radio resource manager 202 and/or the device 206.

A model of radio resource management (e.g., the first model 204-1, and the further models 204-2, 204-3, 204-4 discussed below) may be stored in a memory of the radio resource manager 202, and/or may be stored in a memory to which the radio resource manager 202 is communicatively coupled. A model of radio resource management may run on the processor of the radio resource manager 202, or may run in another entity of the wireless network and the radio resource manager 202 may be configured to receive an output of the model from the other entity.

A model of radio resource management (e.g., the first model 204-1, and the further models 204-2, 204-3, 204-4 discussed below) may be configured to operate on a radio access network environment. Illustratively, a model of radio resource management may be configured to receive input data representative of the radio access network environment and may be configured to provide output data representative of a radio resource management configuration to be applied in the radio access network environment. Illustratively, a model may be configured for inference of a radio resource management configuration based on the radio access network environment. In an exemplary configuration, the memory of the radio resource manager 202 may (further) store the input data provided to a model of radio resource management and/or the output data from the model of radio resource management.

As examples, a model of radio resource management (e.g., the first model 204-1, and the further models 204-2, 204-3, 204-4 discussed below) may be or include a model for power control, a model for precoding, a model for link adaptation, a model for Dynamic Channel Allocation (DCA), a model for Dynamic Frequency Selection (DFS), a model for traffic adaptive handover, a model for re-use partitioning, a model for adaptive filtering, and/or the like. Illustratively, a model of radio resource management may be configured to determine a configuration to implement a strategy of radio resource management based on the radio access network environment.

The radio access network environment that the input data to a model of radio resource management (e.g., the first model 204-1, and the further models 204-2, 204-3, 204-4) represent may include one or more metrics representative of an utilization of the wireless network, e.g. by one or more wireless communication devices communicating or attempting to communicate with the wireless network. As an exemplary configuration, the radio access network environment that the input data to the model represent may include one or more of: a cell traffic volume, a cell physical resource block usage, a downlink physical resource block usage, an uplink physical resource block usage, and/or a number of users (communicating at the radio access network, e.g. at a network access node of the RAN). These metrics have been found to provide a comprehensive characterization of the radio access network for determining which configuration of radio resource management to apply. It is however understood that the radio access network environment may also include additional, less, or alternative metrics as input data to a model.

As an exemplary configuration, a model of radio resource management may be configured (e.g., trained) to determine a radio resource management configuration for a cell or a group of cells of the wireless network. In this case, the radio access network environment may, additionally or alternatively, include one or more metrics related to the cell or group of cells. For example, the radio access network environment that the input data to the model represent may (further) include one or more of: a time series evolution of data associated with the cell or group of cells, environmental characteristics associated with the cell or group of cells, and/or a (geographical) location of the cell or group of cells.

A model of radio resource management may be configured (e.g., trained) to provide as output data a configuration of radio resource management based on one or more known (e.g., learned) patterns of the operation of the radio access network. Illustratively, the model may be configured to map the radio access network environment that the input data represent to one or more known patterns representative of a known (e.g., past) behavior of the radio access network to determine the configuration of radio resource management. As examples, a model of radio resource management may be configured to output the configuration of radio resource management based on one or more of a user pattern, a traffic pattern, and/or a mobility pattern.

As an exemplary configuration, a model of radio resource management may be a per cell model, e.g. may be configured to operate on a radio access network environment of a cell of the wireless network. In this configuration, additionally or alternatively, the model of radio resource management may be (further) configured to base its output on one or more cell-specific parameters. As examples, the model of radio resource management may be (further) configured to output the configuration of radio resource management based on a location of the cell and/or a current time of day. The (geographical) location of the cell and the time may be indicative of an expected utilization of the wireless network, e.g. in case the cell is located in the proximity of a train station a high number of users may be expected during the day, and a low (or lower) number of users may be expected at night, as an example.

A model of radio resource management may be (continuously) trained using data representative of an effect of the radio resource management configuration that the model provided as output (e.g., data available at a network access node where the model is deployed). For example, the radio resource manager 202 and/or the device 206 (e.g., their processor) may be configured to train a model of radio resource management. Illustratively, the radio resource manager 202 and/or the device 206 may be configured to adjust one or more model parameters of a model of radio resource management based on how the configuration of radio resource management actually performed in the radio access network environment. The radio resource manager 202 and/or the device 206 may be configured to adjust the one or more model parameters based on target data (e.g., a target performance, for example a target throughput, a target power consumption, and the like), e.g. based on a difference between the actual performance of the radio resource management configuration defined by the model and the target performance. The radio resource manager 202 and/or the device 206 may be configured to adjust the one or more model parameters to minimize such difference.

As an exemplary configuration, a model of radio resource management may be or may include a machine learning model (an AI/ML model). As examples, a machine learning model of radio resource management may be or may include, a regression model, a classification model, a neural network, a clustering model, etc.

As mentioned above, the radio resource manager 202 may be configured to perform radio resource management according to a model of radio resource management (e.g., the first model 204-1, or another model as discussed below). The radio resource manager 202 may be configured to control or instruct one or more other entities of the wireless network according to the output of the model 204-1, e.g. according to the radio resource management configuration 208-1 that the output of the model 204-1 represents. A radio resource management configuration (e.g., the radio resource management configuration 208-1) may include or may define one or more operations for managing radio resources, such as: power control, precoding, handover, bandwidth allocation, user scheduling, frequency modulation, beamforming, and/or the like, as examples. A radio resource management configuration may also be referred to herein as configuration of radio resource management.

In the exemplary configuration in FIG. 2A, the (first) model 204-1 of radio resource management may be operating on the radio access network environment. A model of radio resource management (e.g., the first model 204-1) operating on the radio access network environment may include the model receiving input data representative of the radio access network environment to provide as output a radio resource management configuration for the radio access network environment. Additionally, a model operating on the radio access network environment may include the model being trained based on data representative of the radio access network environment (e.g., representative of the performance of a radio resource management configuration in the radio access network environment).

The radio resource manager 202 may be configured to perform radio resource management based on information that the radio resource manager 202 receives from the device 206, as discussed in further detail below (see also FIG. 2B).

The device 206 (e.g., a processor of the device 206) may be configured to determine (e.g., calculate, estimate, or forecast) a performance parameter of a model of radio resource management (e.g., of the model 204-1, and the further models 204-2, 204-3, 204-4 discussed below), e.g. a first performance parameter 210-1 of the first model 204-1 in the configuration in FIG. 2A. A performance parameter of a model may be representative of a performance of that model of radio resource management, e.g. based on the radio access network environment. Illustratively, the device 206 may be configured to calculate, estimate or forecast whether or to what extent the model of radio resource management is suitable for determining a radio resource management configuration to apply in the radio access network environment.

The performance of a model may be or include a forecast (e.g., estimated, or predicted) performance of that model in the radio access network environment. Illustratively, the performance of a model may be or include a forecast (e.g., an estimation, or a prediction) of the effectiveness and/or the accuracy of modelling (and carrying out) radio resource management using the model in the given radio access network environment. Further illustratively, the performance parameter of a model may be representative of an operation of the wireless network in case radio resource management is carried out using the model.

The device 206 may be configured to determine a performance benefit associated with the model 204-1 of radio resource management, e.g. a performance benefit associated with the radio resource manager 202 performing radio resource management using the (first) model 204-1 in the radio access network environment. Illustratively, the performance parameter 210-1 may be representative of a performance of the wireless network (e.g., of a network access node) in case the radio resource manager 202 performs radio resource management using the (first) model 204-1 (e.g., using a radio resource management configuration according to the output of the model 204-1).

The device 206 may be configured to forecast (e.g., predict, or estimate) a performance of radio resource management in case the radio resource manager 202 performs radio resource management using the model (e.g., a performance of the wireless network according to one or more communication-based metrics and one or more computation-based metrics, discussed below), and the device 206 may be configured to determine the performance parameter according to the forecast.

A performance parameter of a model of radio resource management may be representative of various metrics associated with the use of the model and with the wireless network. The device 206 (e.g., its processor) may be configured to determine the performance parameter of a model based on one or more metrics associated with the model and with the wireless network (e.g., one or more computation-based metrics and one or more communication-based metrics). As examples the device 206 may be configured to determine the performance parameter of a model (e.g., the first performance parameter 210-1) based on one or more of: a throughput (e.g., per cell, such as an average cell throughput, a median cell throughput, a peak cell throughput, and/or combinations thereof), a latency, a network coverage, computational cycles for running the model, computational complexity of the model, power consumption of running the model, and/or combinations thereof. These metrics have been found to enable an efficient estimation of how a model may or will perform in a given radio access network environment, but it is understood that the determination of a process parameter of a model may include additional, less, or alternative metrics.

Illustratively, the device 206 may be configured to determine the performance parameter 210-1 of the model 204-1 by determining (e.g., calculating, estimating, or forecasting) the effect(s) that performing radio resource management using the model 204-1 may have on the one or more computation-based metrics and on the one or more communication-based metrics. As an exemplary scenario, the model 204-1 may be a model designed for a radio access network environment with a high number of users (e.g., may be a complex model designed for more than 100 users, or more than 500 users, as examples), so that in case the actual radio access network environment includes a low number of users (e.g., less than 50, or less than 10, as an example) the device 206 may determine that performing radio resource management using the model 204-1 may require a heavy use of computational resources without improving communication performance in the given radio access network environment, and the performance parameter of the model may be representative of such determination.

As an exemplary configuration, the performance parameter of a model may be representative of the performance of the model in the radio access network at the time of the determination and at a subsequent time (in the future). Illustratively, the device 206 may be configured to determine the performance parameter of a model not only in relation to the radio access network environment at the time of the determination but also based on a forecast (e.g., estimated or predicted) evolution of the radio access network environment. As an example, the device 206 may be configured to determine the performance parameter based on a known or forecast number of users, e.g. based on a known or forecast increase or decrease in the number of users, for example in case a daily commute of users to and from the workplace is about the happen or is about to end, or for example in case an event gathering many users (e.g., a concert) is about to start or to end. Additionally or alternatively, the performance parameter of a model may be representative of the accuracy of the model in the given radio access network environment.

In the case that a cell or a group of cells of the wireless network are considered, e.g. in the case that the model of radio resource management is a per cell model configured to operate in the environment of the cell, the performance parameter may be, additionally or alternatively, representative of the performance of the model in the cell context. The performance parameter of the model may be representative of the (e.g., forecast) performance of the model of radio resource management in relation to the cell or a group of cells of the wireless network.

A performance parameter may express the performance of the associated model of radio resource management in various ways. As an example, the performance parameter may be or include a value (e.g., a number), e.g. a sum or a weighted sum of respective values that the device 206 assigns to the metrics associated with the model and with the wireless network (illustratively, one or more scores associated with the one or more communication-based metrics and one or more scores associated with the one or more computation-based metrics). Illustratively, the performance parameter may be or include a score representative of the performance of the model, e.g. as sum or weighted sum of respective scores related to the metrics. It is however understood that the performance parameter may express the performance of the model in ways other than a numeric value, for example in a graphic manner (e.g., with a color), with a string of text, etc.

In an exemplary configuration, the device 206 (e.g., its processor) may be configured to determine the performance parameter of a model of radio resource management based on information that the radio resource manager 202 provides to the device 206. The radio resource manager 202 may be configured to transmit information to the device 206 representative of the model and/or of the radio access network environment (e.g., of a cell, or of a network access node). The information that the radio resource manager 202 provides to the device 206 may include one or more moments of the radio access network environment and/or of the model, e.g. one or more weighted combinations (e.g., weighted averages) of metrics associated with the radio access network environment and/or the model. As an example, the information that the radio resource manager 202 provides to the device 206 may include first, second, and higher order moments of cell characteristics, for example uplink/downlink traffic/load, average cell throughput, and the like. As another example, additionally or alternatively, the information that the radio resource manager 202 provides to the device 206 may include first, second, and higher order moments of corresponding model prediction performance, such as error, confidence in prediction, and the like. Determining the performance parameter based on information from the radio resource manager 202 may increase the precision of the determination.

In an exemplary configuration, additionally or alternatively, the device 206 (e.g., its processor) may be configured to determine the performance parameter of a model of radio resource management in accordance with one or more management preferences of the wireless network, illustratively one or more operator preferences representative of one or more rules of operating the wireless network. The one or more operator preferences may be representative of one or more of: priority cells for which a respective performance parameter is to be determined, one or more threshold values associated a performance range (e.g., for a cell), and/or list of models of radio resource management for which a respective performance parameter is to be determined.

In an exemplary configuration, additionally or alternatively, the device 206 (e.g., its processor) may be configured to determine the performance parameter of a model of radio resource management by using a machine learning model (e.g., a regression model, a classification model, a neural network, a clustering model, etc.). Illustratively, the device 206 may be configured to provide as input to the machine learning model the one or more metrics representative of the radio access network environment and the model of radio resource management, and the machine learning model may be configured to provide an output representative of the performance parameter (e.g., a score corresponding to the performance parameter). The determination of the performance parameter using a machine learning model may provide the possibility of continuously training the model (e.g., with supervised or unsupervised learning), thus increasing the precision of the determination.

Figure 2B:
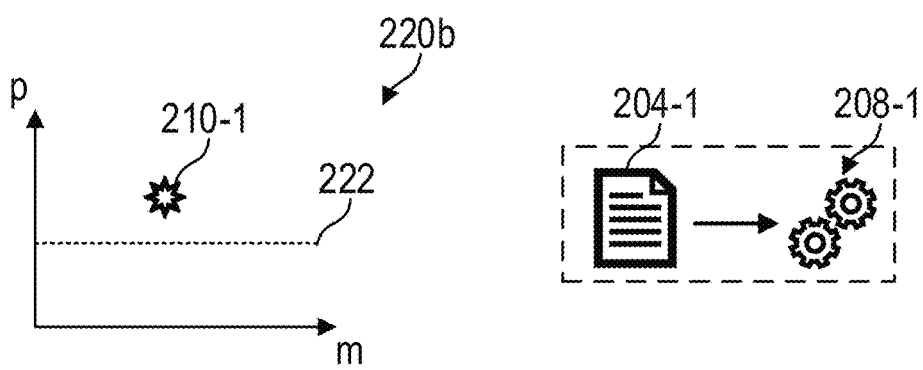
FIG. 2B, FIG. 2C, and FIG. 2D exemplarily show radio resource management dependent on a performance parameter of a model of radio resource management in a schematic representation, according to the present disclosure.
Figure 2C:
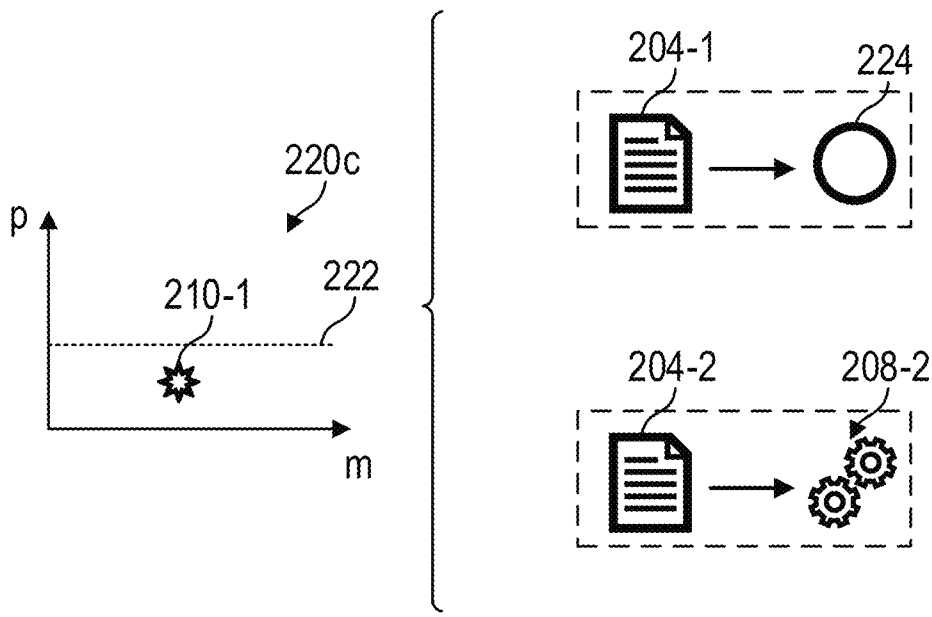
Figure 2D:
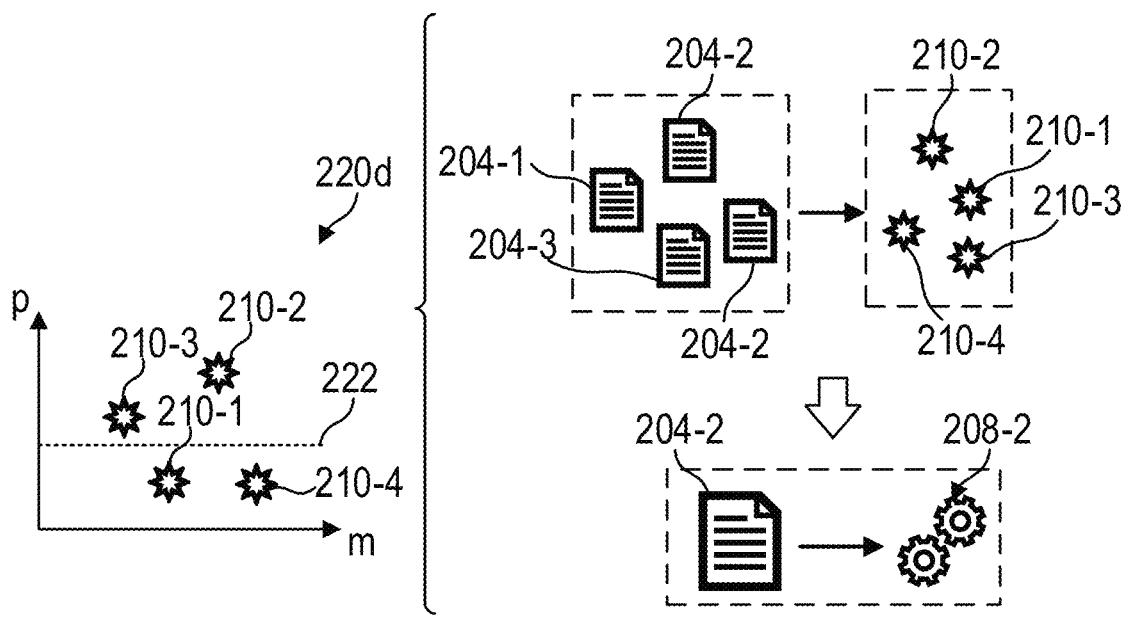

The radio resource manager 202 may be configured to perform radio resource management dependent on the performance parameter(s) that the device 206 determines, as described in further detail in FIG. 2B to FIG. 2D. The device 206 may be configured to instruct radio resource management dependent on the determined performance parameter, e.g. may be configured to transmit an instruction to the radio resource manager 202 based on the determined performance parameter. In an exemplary configuration, the radio resource manager 202 may be configured to transmit to the device 206 a minimum performance expected from a model (e.g., from the first model 204-1), and the device 206 may be configured to instruct radio resource management based on the determined performance parameter and the expected minimum performance, as described in further detail below. Radio resource management based on the determined performance parameter will be described in relation to FIG. 2B to FIG. 2D.

FIG. 2B, FIG. 2C, and FIG. 2D exemplarily show radio resource management dependent on a performance parameter of a model of radio resource management in a schematic representation, according to the present disclosure. FIG. 2B to FIG. 2D illustrate exemplary decisions taken according to the determined performance parameter(s) of model(s) of radio resource management, it is however understood that additional, less, or alternative decisions may be taken, e.g. based on a different interpretation of a performance parameter, as an example. The graphs 220b, 220c, 220d in FIG. 2B to FIG. 2D may represent a value, p, of a performance parameter associated with a model, m.

As shown in FIG. 2B, the radio resource manager 202 may be configured to perform radio resource management using the (first) model 204-1 of radio resource management in case that the (first) performance parameter 210-1 is in a predefined performance range. Illustratively, in case the device 206 determines for the model 204-1 operating on the radio access network environment a performance parameter 210-1 representative of a (forecast) performance providing an overall benefit, the radio resource manager 202 may be configured to use the output of the model 204-1 and/or to continue running the model 204-1.

A predefined performance range may be a range of values for a performance parameter (e.g., for the performance parameter 210-1 and for further performance parameters 210-2, 210-3, 210-4 discussed below), e.g. a range of scores, such that a model having a performance parameter falling in the range is known to provide an overall benefit for the wireless network, e.g. in terms of throughput, latency, power consumption, etc. The predefined performance range may be associated with a threshold value 222, e.g. a minimum performance parameter value 222, defining the performance range. Illustratively, a performance parameter being in the predefined performance range may be a performance parameter having a value greater than the threshold value 222 (e.g., a score greater than a threshold score). Additionally or alternatively, a performance parameter being in the predefined performance range may be representative of an accuracy of the model falling above a predefined confidence level.

In case the performance parameter 210-1 of the model 204-1 is outside the predefined performance range (e.g., in case the value of the performance parameter is less than the threshold value 222), as shown in the graph 220c in FIG. 2C, the model 204-1 may go into a sleep state 224, and optionally another (second) model 204-2 of radio resource management may provide a radio resource management configuration 208-2 to apply in the radio access network environment. A performance parameter 210-1 being outside the predefined performance range may indicate that the performance of radio resource management according to the model does not provide sufficient benefit for the network, and/or that an accuracy of the model falls below a predefined confidence level.

At least one of the device 206 (e.g., its processor) or the radio resource manager 202 may be configured to stop an execution of the (first) model 204-1 in case that the performance parameter 210-1 of the model 204-1 is not in the predefined performance range. For example, the device 206 may be configured to instruct a stop of the execution of the model 204-1 in case the determined process parameter is outside the predefined performance range, e.g. is less than the threshold value 222. As another example, the radio resource manager 202 may be configured to stop the execution of the model 204-1 upon receiving the determined performance parameter 210-1 from the device 206. Stopping an execution of a model of radio resource management (e.g., of the model 204-1) may include stop using the model for inference (for determining a radio resource management configuration) and, additionally or alternatively, stop training the model (e.g., stop the training based on data representative of the radio access network). Illustratively, at least one of the device 206 (e.g., its processor) or the radio resource manager 202 may be configured to push the model 204-1 into sleep 224 in case the performance of the model does not provide sufficient benefit in the network scenario.

In this case, additionally or alternatively, at least one of the device 206 or the radio resource manager 202 may be configured to discard an output of the model 204-1 in case that the performance parameter 210-1 is not in the predefined performance range, e.g. in case the performance parameter is less than the threshold value 222. Illustratively, at least one of the device 206 or the radio resource manager 202 may be configured to indicate that a radio resource management configuration provided as output of the model 204-1 is not to be applied in the radio access network environment.

Additionally or alternatively, the radio resource manager 202 may be configured to perform radio resource management using a further (second) model 204-2 of radio resource management in case that the performance parameter 210-1 (of the first model 204-1) is not in the predefined performance range. For example, the device 206 may be configured to instruct the radio resource manager 202 to use the further model 204-2 upon determining that the performance parameter 210-1 of the first model 204-1 is not in the predefined performance range. As another example, the radio resource manager 202 may be configured to switch to using (e.g., for inference and training) the further model 204-2 upon receiving the determined performance parameter 210-1 of the (first) model 204-1 from the device 206. During the switchover (from the first model 204-1 to the second model 204-2), neural engine modules may be temporarily power gated or put in low power modes. It is understood that there may be a plurality of further models which the radio resource manager 202 may use for performing radio resource management in case the first model 204-1 is found not suitable for the network environment (see also FIG. 2D).

The further model 204-2 of radio resource management may have a lower computational complexity with respect to the first model 204-1 of radio resource management. As an example, the first model 204-1 of radio resource management may be a highly complex model that the radio resource manager 202 uses by default in the radio access network environment. However, in case the performance parameter 210-1 of the first model 204-1 indicates a non-beneficial performance, the radio resource manager 202 may be configured to switch to a lower complexity model 204-2, thus saving computational power, reducing heat, etc. As examples, the further model 204-2 may be less complex than the first model 204-1 in one or more of: a number of inputs (e.g., the second model 204-2 may be configured to operate with a lower number of inputs than the first model 204-1), iterations (e.g., may include less iterations to provide the output with respect to the first model 204-1), model parameters (e.g., the second model 204-2 may include less tunable parameters with respect to the first model 204-1), and/or the like.

As an exemplary configuration, the second model 204-2 of radio resource management may be or include a further (second) machine learning model having lower computational complexity with respect to the first machine learning model 204-1. For example, the second machine learning model may be configured to operate with a lower number of inputs with respect to the first machine learning model. As another example, considering neural networks, the second machine learning model may have a lower number of neural network layers with respect to the first machine learning model.

As an exemplary configuration, the further model 204-2 of radio resource management may be or include a heuristics, illustratively may be configured to provide a radio resource management configuration 208-2 based on practical considerations rather than on a fine data analysis. As an example, the further model 204-2 may be configured to provide the radio resource management configuration 208-2 simply considering the time of the day or the geographical location of a cell, without further considerations on the network environment. Such simple approach may suffice in terms of performance in certain scenarios, and may be computationally simple, thus saving power compared to more complex models.

In this case, the information that the radio resource manager 202 provides to the device 206 may include a benchmark performance of the simple heuristics, so that the device 206 may be configured to compare the determined performance parameter of the first model 204-1 with the benchmark performance to instruct the radio resource management (e.g., to instruct using the heuristics in case the performance parameter of the first model 204-1 indicates a (forecast) performance worse than the benchmark performance, e.g. with less throughput, less latency, etc., see also FIG. 2D).

The decision on which model to use for performing radio resource management may be based on the determination of respective performance parameters of a plurality of models of radio resource management, as shown in FIG. 2D. In FIG. 2D four models of radio resource management 204-1, 204-2, 204-3, 204-4, with respective performance parameters 210-1, 210-2, 210-3, 210-4 are illustrated. It is however understood that the discussion in relation to FIG. 2D may apply to any number of models of radio resource management.

The device 206 (e.g., its processor) may be configured to determine a plurality of performance parameters 210-1, 210-2, 210-3, 210-4 of a plurality of models of radio resource management 204-1, 204-2, 204-3, 204-4 to assist the radio resource manager 202. Illustratively, the device 206 may be configured to determine a plurality of performance parameters representative of a respective (forecast) performance of a plurality of models operating on the radio access network environment. The radio resource manager 202 may be configured to perform radio resource management dependent on the plurality of determined performance parameters 210-1, 210-2, 210-3, 210-4, e.g. the device 206 may be configured to instruct radio resource management dependent on the plurality of determined performance parameters.

The plurality of models of radio resource management 204-1, 204-2, 204-3, 204-4 may have different levels of computational complexity, e.g. some of the models may be machine learning models, e.g. some other models may be heuristics, e.g. some models may operate with less inputs than other models, etc.

The device 206 (e.g., its processor) may be configured to compare the plurality of performance parameters with one another, and the radio resource manager 202 may be configured to perform radio resource management dependent on a result of the comparison. Considering the exemplary scenario in FIG. 2C, the device 206 may be configured to compare the (first) performance parameter 210-1 and the further performance parameter 210-2 with one another. Considering the exemplary scenario in FIG. 2D, the device 206 may be configured to compare the first, second, third, fourth performance parameters 210-1, 210-2, 210-3, 210-4 with one another. Illustratively, the radio resource manager 202 may be configured to perform radio resource management according to the model having the performance parameter representative of the greatest performance benefit among the models of radio resource management (e.g., representative of the greatest increase in throughput, greatest reduction in power consumption, etc.).

For example, the radio resource manager 202 may be configured to perform radio resource management by using the model with the greatest performance parameter associated therewith, e.g. by using the model with the greatest score among the determined performance parameters. For example, referring back to FIG. 2C, the device 206 may be configured to determine (e.g., calculate, estimate or forecast) a further (second) performance parameter 210-2 representative of a performance of the further model of radio resource management, and the radio resource manager 202 may be configured to execute the further model 204-2 of radio resource management in case that the further performance parameter 210-2 is in the predefined performance range (e.g., is above the predefined threshold), and thus is greater than the first performance parameter 210-1 considering FIG. 2C.

In the exemplary configuration in FIG. 2D, the device 206 may determine four performance parameters 210-1, 210-2, 210-3, 210-4, as shown in the graph 220d. The performance parameters 210-1, 210-4 of the first model 204-1 and of the fourth model 204-4 may be outside the predefined performance range, so that the device 206 or the radio resource manager 202 may push such models to sleep (if in execution/training) and/or may decide not to run such models. The performance parameters 210-2, 210-3 of the second model 204-2 and of the third model 204-3 may be in the predefined performance range, and the performance parameter 210-2 of the second model 204-2 may have a greater value with respect to the performance parameter 210-3 of the third model 204-3. Thus, although both the second model 204-2 and the third model 204-3 may provide performance benefits for the network, overall the forecast performance of using the second model 204-2 leads to a better scenario (e.g., in terms of power consumption, throughput, etc.) with respect to the forecast performance of using the third model 204-3.

In case none of the performance parameters of the available models of radio resource management falls in the performance range, the device 206 may be configured to instruct stalling (in other words, pausing) radio resource management, e.g. the radio resource manager 202 may be configured to pause radio resource management (until a model may provide sufficient performance in the radio access network environment, e.g. sufficient throughput combined with sufficient power saving).

An exemplary scenario may be as follows, considering a machine learning model and a heuristics. The device 206 (the PFPSM) may forecast the performance of AI/ML model (e.g., the first model 204-1) and corresponding compute light heuristic (e.g., the second model 204-2). In case the device 206 determines that the AI model performs better than the heuristic (over a given threshold 222), then the radio resource manager 202 may continue using the AI/ML model. On the other hand, in case the device 206 determines that the AI model performs worse than the heuristic (relative to a threshold 222) then device 206 may select heuristic algorithm and may communicate the choice to the radio resource manager 202. In case both the AI model and default heuristic perform below the required threshold then the use of models of radio resource management may be stalled (in absence of another suitable model).

As an example, the device 206 may be configured to forecast the performance benefit simply using error histogram. For example, if the 90th percentile of load prediction error is greater than 25%, then the device 206 may configured to instruct switching to heuristics of estimating load by previous load sample. Illustratively, a mean error of downlink physical resource block usage prediction for a cell may be 10%, but 90th Percentile of downlink physical resource block usage is 25%, for a sophisticated load prediction 5-layer neural network with 100 inputs. There is high importance associated with 90th percentile of error as communicated by the algorithm. Also, as an example, a very low compute load predictor may be the previous sample predictor, where next step predicted load is same as present load. The 90th percentile error of this simple model is 15%. The reason why a simple model may outperform a complicated model may be due to high correlation of future load sample with just the present sample and not much correlation with other features used in the complicated model. In this scenario, the device 206 may forecast the benefits of using the simple model.

It is understood that the device 206 may also implement other (e.g., more sophisticated) forecasting procedures. As another example, the device 206 (the PFPSM) may, additionally or alternatively, be configured to track the power/compute of AI/ML model and default low compute heuristic. The device 206 may be configured to base its decision on the objective to minimize power while maintaining reasonable performance. The device 206 may be configured to communicate the taken decision to the radio resource manager 202, which takes appropriate action as suggested by the device 206.

It is understood that the scenario is not restricted to a single low compute heuristic, and the procedure may be correspondingly adapted to compare a high complexity AI model with a low compute AI model. For example, a (first) model of radio resource management may be a complicated model when the load is high, however another (second) model with low complexity may be more suitable for low load.

In an exemplary configuration, additionally or alternatively, the device 206 may be configured to repeat the determination of the performance parameter of a model (and/or of a plurality of performance parameters with the comparison of the parameters with each other) at predefined time intervals, e.g. every 10 minutes, every 30 minutes, every hour, etc. This may provide having an updated understanding of how a model is performing or is forecast to perform, to update the decision on which model to use, if necessary.

As an exemplary configuration, the device 206 may be an entity distributed wherever distributed training or inference is/are implemented in the wireless network. In this configuration, the device 206 may be configured to evaluate the performances of models of radio resource management locally, e.g. in the local environment of a distributed unit, or of a network access node, as examples. For example, in case a distributed learning scheme, such as federated learning, is used at each distributed unit within an ORAN network to help optimize local radio resource management decision making, and the PFPSM judges that the local training/inference model is performing below the desired performance threshold, it may instruct the switch to a simpler model locally.

As an additional or alternative configuration, the device 206 may be configured to determine a performance parameter of a model of radio resource management upon receiving a request (e.g., from the radio resource manager 202). Illustratively, the device 206 may be configured to receive a request of determining the performance parameter, and may be configured determine the performance parameter in response to the request. The device 206 may be configured to receive the request over an application programming interface, as an example.

The request may include an instruction for the device 206 to perform the determination of the performance parameter of a certain model (or a certain plurality of models), e.g. the model currently operating at the radio resource manager 202. For example, the radio resource manager 202 may be configured to transmit the request to the device 206 (over the API), e.g. at predefined time intervals, such as every 10 minutes, every 30 minutes, every hour, etc. The radio resource manager 202 may be configured to identify that a device 206 for determining the performance parameter is available, e.g. in the wireless network, and may be configured to interact with the device 206 over the API. The radio resource manager 202 may be configured to identify the device 206 over an identification API.

The request may include information representative of the model (and its known performance), as mentioned above. As additional or alternative examples, the information of the request may be representative of one or more of: a class of the model, a regime of the model, a minimum performance requirement for each class of the model, past performance associated with the model, one or more inputs of the model, one or more model parameters of the model, error characteristics and/or error statistics of the model, prediction confidence of the model, and/or a function of error and/or characteristic of the model. The device 206 may be configured to determine the performance parameter of the model (further) based on the information that the request includes.

The device 206 may be further configured to respond to the request, e.g. to provide a result of the determination of the performance parameter (and/or a result of a comparison of the performance parameter with further performance parameter(s)) in response to the request. As an example, the radio resource manager 202 may be configured to receive an answer to the request over an application programming interface.

Figure 2E:
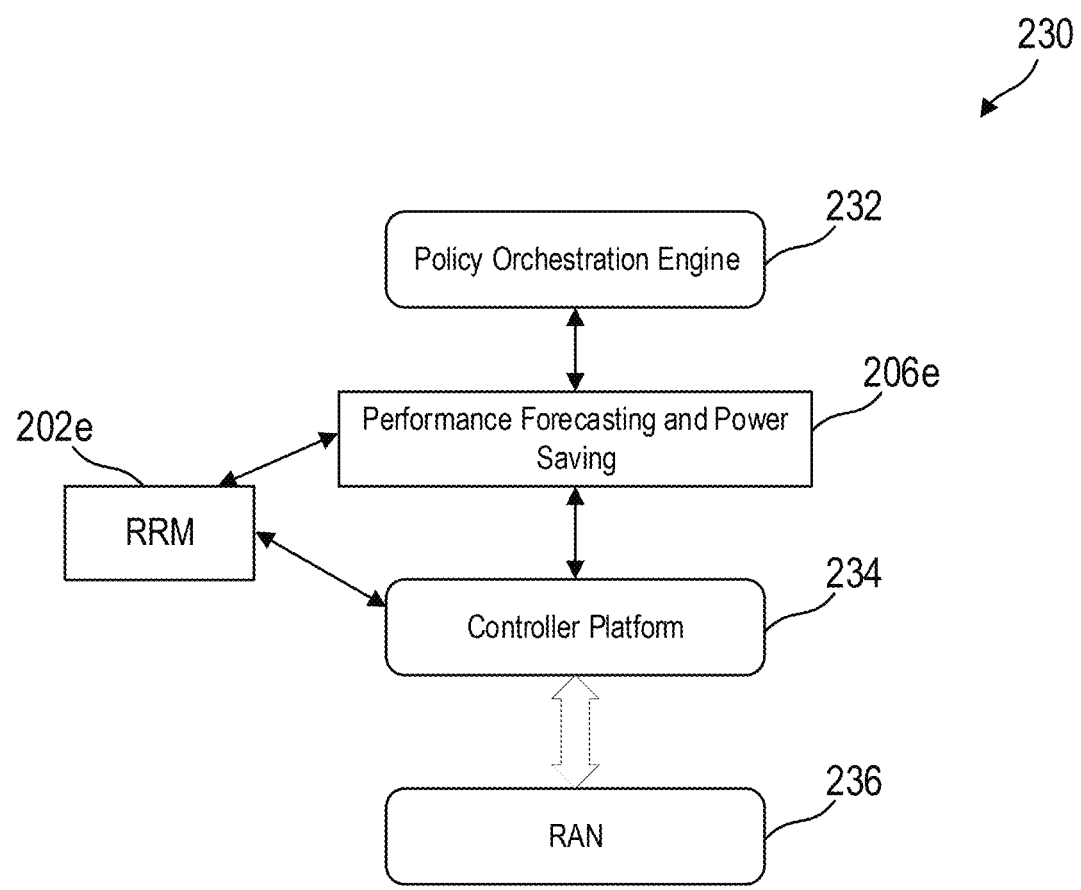
FIG. 2E shows an exemplary performance forecasting and power saving device and an exemplary radio resource manager in the context of an exemplary wireless network in a schematic representation, according to the present disclosure.

FIG. 2E shows an exemplary performance forecasting and power saving device 206e and an exemplary radio resource manager 202e in the context of an exemplary wireless network 230 in a schematic representation, according to the present disclosure. The schematic representation in FIG. 2E may illustrate an exemplary configuration of a wireless network 230 including a radio resource manager 202e and a PFPS device 206e (configured as the radio resource manager 202 and the device 206 described in relation to FIG. 2A to FIG. 2D). The radio resource manager 202e and PFPS device 206e may be part of a controller platform 234 of a RAN 236 of the wireless network 230.

The radio resource manager 202 may be configured to identify the presence of the PFPS device 206e using an identification API. The PFPS device 206e may be configured to receive operator preferences from a policy orchestration engine 232, for example via a policy API. The operator preferences may include, for example, priority cells where PFPSM may be used, thresholds for minimum performance of the models, RRM models for which PFPSM may be used, and the like. Illustratively, the operator of the wireless network remains in control of where and how the PFPSM may be used.

The PFPS device 206e may be configured to receive a message from the RRM 202e, for example via a PFPS (M) API, containing a request to forecast performance and push a model into sleep state (by possibly stalling the compute of the model) to save power if the performance is below a threshold or model accuracy falls below a certain confidence level.

The message from the RRM 202e to the PFPS device 206e may include, as examples: (i) the different classes/regimes of the algorithm (ii) with corresponding importance for the algorithm (iii) minimum performance requirement for each class (iv) past performance of the algorithm in terms of KPIs for example, throughput, latency etc. (v) corresponding input features for example, DL PRB usage, number of users, incident traffic etc. useful to forecasting performance (vi) model parameters (vii) error characteristics/statistics for example histogram of prediction (viii) confidence in prediction (ix) function of error/characteristic that has high importance for the algorithm, and/or the like.

The PFPS device 206e may be configured to calculate if the estimated forecast performance of the RRM model provides benefit for a cell/group of cells over default computationally simple heuristic. Further, the PFPS device 206e may be configured to push the AI/ML model into sleep/default heuristic mode if performance benefit is not reasonable. The PFPS device 206e may be further configured to convey the RRM model via PFPSM API, if the compute pertaining to the RRM model needs to be stalled/pushed to default heuristic for a particular cell/group of cells.

By way of illustration, the PFPS device 206e may be configured to identify the cells which might not gain from certain AI/ML models, and to push the respective model computations into sleep states (possibly denoted by compute simple alternative heuristics) to save power. The PFPS device 206e may be called by multiple radio resource managers 202e (e.g., for multiple RRM models) and can be implemented on a controller platform 234, thus, minimizing the data and memory overhead. The PFPS device 206e works on top of existing AI/ML techniques used in different RRM algorithms. It is applicable to per cell models as well as centralized/distributed learning scenarios.

The approach described herein may thus provide using/switching models of radio resource management models dynamically (choosing say one model over other) or deciding to use a static model, in order to (i) save power on controller platform in gNB/eNB, while (ii) maintaining reasonable performance and minimizing the data and processor overhead (iii) in a manner that would be suitable to implement over a controller platform, such as RIC.

Figure 3:
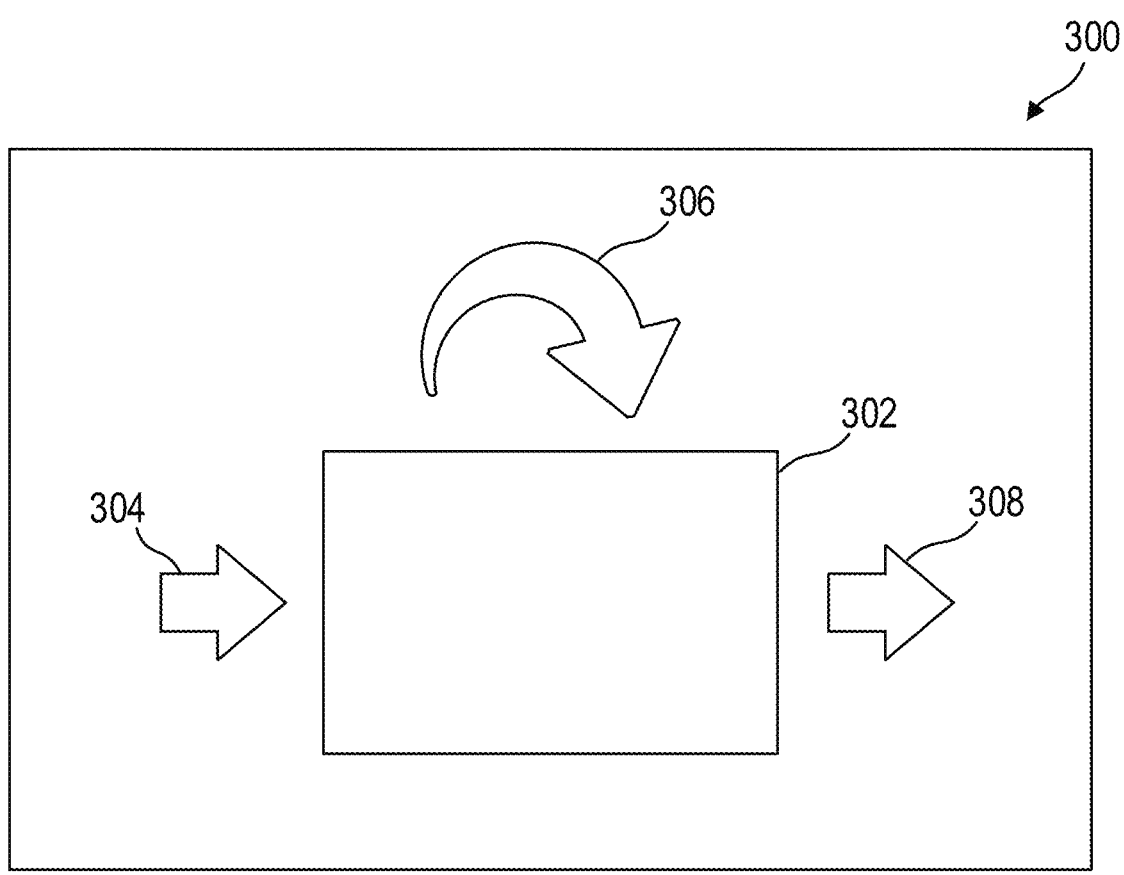
FIG. 3 exemplarily shows learning at a device for performance forecasting and power saving in a wireless network in a schematic representation, according to the present disclosure.

FIG. 3 exemplarily shows learning at a device 300 for performance forecasting and power saving in a wireless network in a schematic representation, according to the present disclosure. The device 300 may be configured as the device 206, 206e described in relation to FIG. 2A to FIG. 2E. In relation to FIG. 3 a possible learning strategy for determining the performance parameter(s) of model(s) of radio resource management will be described.

Additionally or alternatively to the configurations discussed in relation to FIG. 2A to FIG. 2E, the device 300 may be configured to select (for radio resource management at the radio resource manager) a model of radio resource management among a plurality of models of radio resource management based on which performance parameter of the models indicates a better long term performance, based on the radio access network environment. Illustratively, the device 300 may be configured determine the performance parameter(s) of the model(s) based on a (forecast) performance over an extended period of time, e.g. over one hour, over three hours, over five hours, as examples. Considering the scenario in FIG. 2C, the device 300 may be configured to determine the performance parameter of the first model and the further performance parameter of the second model based on a performance over an extended period of time.

As an exemplary configuration, the device 300 may be configured to select a model of radio resource management among a plurality of models of radio resource management (e.g., to select the first model or second model) according to a reinforcement learning technique. PFPSM may be implemented using reinforcement learning (RL) based approach. The long term performance may be a reward for the reinforcement learning. In this configuration, the device 300 may include a reinforcement learning agent 302, or the processor of the device 300 may be (further) configured as reinforcement learning agent 302. By way of illustration, the device 300 may be configured to determine which model to apply not only for the immediate gain but more in general for an expected gain over a longer time scale, e.g. to maximize the expected reward in the future. As an alternative configuration the PFPSM device 300 may be based on supervised learning model instead of RL agent.

The concept of "reinforcement learning" may be known in the art. In brief, reinforcement learning may include an agent and an environment, and the agent may take actions to interact with the environment. Based on the actions taken, the agent may receive a positive reward, so that the agent may learn which actions lead to obtaining the reward and which actions instead do not. The agent may design a policy to define which actions (a) to take, given a state(s) of the environment, to maximize the chances to get a (future) reward (R). The selection of an action in a given state may be probabilistic, to take into account for the probabilistic rather than deterministic nature of the environment. Reinforcement learning may be based on different strategies, such as differential programming, Monte Carlo, Temporal Difference, etc.

In the context of the present disclosure, the agent 302 may be the PFPS device or may be part of the PFPS device, the state of the environment 304 may be the radio access network environment, the actions 306 may be the selection of a certain model of radio resource management (and/or performing radio resource management using the output of the model), and the rewards 308 may be associated with the performance of the network with the selected radio resource management configuration. For example, the state of the agent may be defined by the cell characteristics. Action may pertain to choosing one model over other. Reward may be function of compute and performance. Finally, objective may be to minimize the long-term power consumed and maximize the long term performance.

As an exemplary scenario to describe reinforcement learning, the model of radio resource management may be over-load control for a cell, in which load prediction may be used to predict the load, and if load is above a threshold some standard corrective action may be taken. In this scenario, the task for PFPS device 300 is to choose the right load prediction model so as to maximize power saving while providing reasonable performance.

State(s): the cell characteristics may include, as examples, the following cell information features depending on the RRM model which it is serving: load metrics such as DL/UL PRB usage, Packet Data Convergence Protocol (PDCP) traffic volume, number of radio resource control (RRC) connected/active UEs in the cell etc.; mobility metrics such as average cell UE speed; spectral efficiency metrics such as CQI histogram of UEs in the cell etc.; neighboring cell information such as average load of neighboring cells, average interference etc.

Action (a): for example three models for radio resource management may be available, so that there is alternative of choosing among: Model 1, which is AI/ML based and computationally expensive, for example a neural network, which takes into account last 100 samples along with sophisticated features to predict future load; Model 2, which is AI/ML based as well but low on compute for example an XG-Boost ML model using last 10 samples to predict future load; and a Model 3, which is a simple heuristic of assuming future load to be the current load. Clearly Model 3 is the simplest model, however the prediction quality may not be the best. Thus, the action here for PFPSM agent 302 is choosing one of the three models for the particular RRM algorithm.

Reward (R): reward may be a function of end to end performance such as throughput, latency, coverage etc. and also a metric for power consumption such as CPU cycles, compute complexity, power consumed for carrying out the compute etc. Reward can take a functional form such as, $$R(s,a)=C(s,a)-k*P(s,a),$$

where C (s,a) represents cell throughput observed, which is function of the state(s) and action (a), P represents power consumption for the compute of model (including training/inference), and k is a constant that may be used to balance the tradeoff of performance and power. The reward can also take into account multiple objective including data collection overhead for an ML model vs non-ML model etc.

As an example, the device 300 may be configured to receive a positive reward for a selected model in case the cell throughput is above a predefined (target) threshold. In this case, the device 300 may be configured to learn that the action of selecting that model in that network environment lead to the reward, so that the device may adapt the policy to increase the probability of taking that action (selecting that model) in case a network environment with similar characteristics presents itself again in the future (and correspondingly decrease the probability of selecting another model). On the other hand, in case the device 300 does not receive any positive reward (e.g., in case the cell throughput is below a predefined (target) threshold), the device 300 may be configured to learn that the action of selecting that model in that network environment did not lead to the reward, so that the device may adapt the policy to decrease the probability of taking that action (selecting that model) in case a network environment with similar characteristics presents itself again in the future (and correspondingly increase the probability of selecting another model).

Figure 4A:
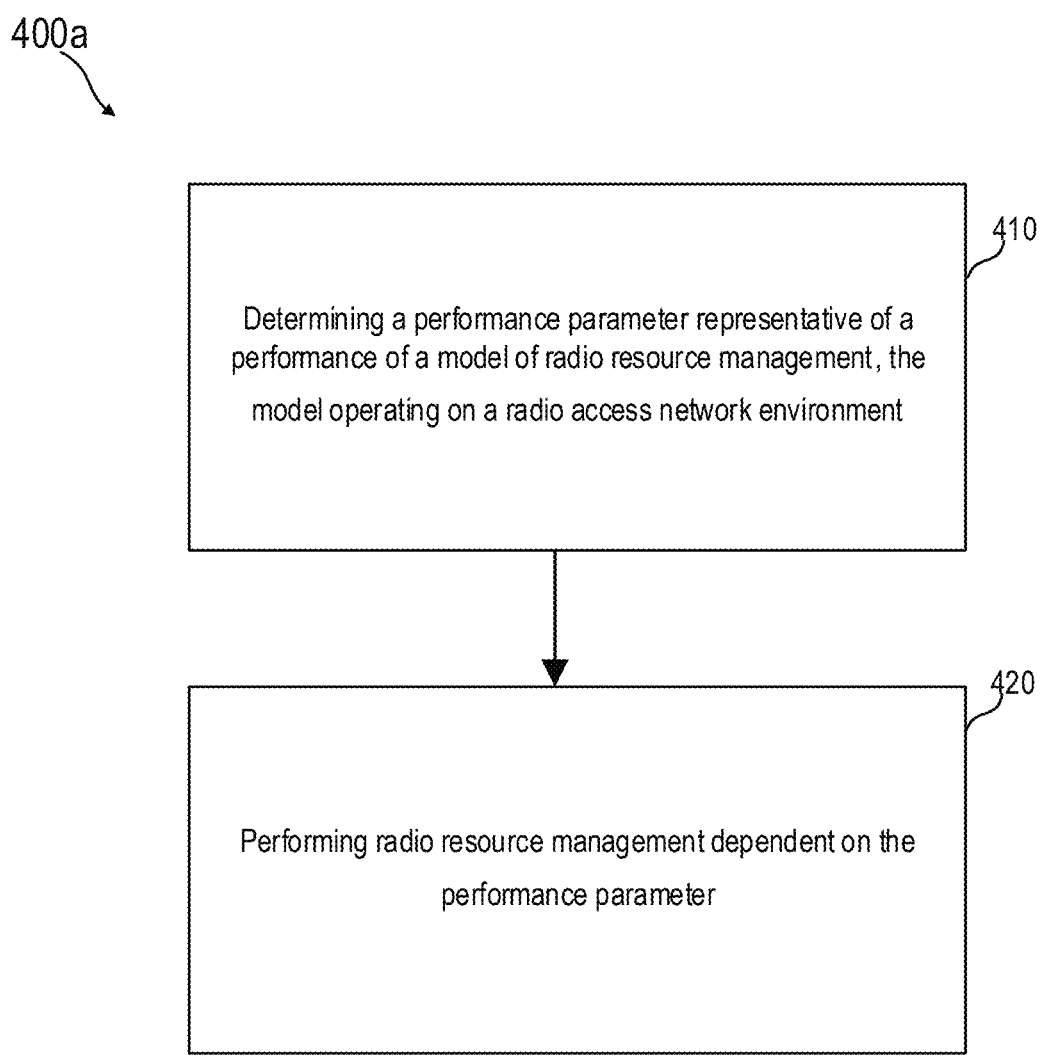

FIG. 4A and FIG. 4B each shows a flow diagram of an exemplary method 400*a*, 400*b* of performing resource management in a wireless network in a schematic representation according to the present disclosure. The method 400*a*, 400*b* may be based on the operation of the system 200 described in relation to FIG. 2A to FIG. 2E, so that a repetition of the concepts already discussed above will be omitted. It is however understood that the discussion above in relation to the system 200 may apply in a corresponding manner to the method 400*a*, 400*b*. The method 400*a*, 400*b* may be a computer-implemented method.

The method 400*a*, in FIG. 4A, may include, in 410, determining (e.g., calculating, estimating, or forecasting) a performance parameter representative of a performance of a model of radio resource management, the model operating on a radio access network environment. The method 400*a* may include, in 420 performing radio resource management dependent on the performance parameter. As an additional or alternative configuration, the method 400*a* may include instructing radio resource management dependent on the performance parameter. Illustratively, the method 400*a* may be understood to include a first part including the determination of the performance parameter of a model of radio resource management, and a second part including radio resource management based on the determined parameter. The first part and the second part may be carried out at a same entity of the wireless network, or at separate entities of the wireless network (e.g., at a PFPS module, and at a radio resource manager, as examples).

Performing radio resource management dependent on the performance parameter 420 may include, for example, continue using the model in case that the performance parameter is in a predefined performance range. As another example, performing radio resource management dependent on the performance parameter 420 may include stopping an execution of the model in case that the performance parameter is not in the predefined performance range. As a further example, performing radio resource management dependent on the performance parameter 420 may include discarding an output of the model in case that the performance parameter is not in the predefined performance range.

The method 400*a* may further include performing radio resource management using a further model (e.g., with lower computational complexity) of radio resource management in case that the performance parameter is not in the predefined performance range.

As an exemplary configuration, determining the performance parameter 410 may include determining a plurality of performance parameters of a plurality of models for radio resource management, and comparing the plurality of performance parameters with one another. The method 400*a* may further include performing radio resource management dependent on the result of the comparison, e.g. selecting as model of radio resource management the model with the greatest performance parameter associated therewith.

As an exemplary configuration, the method 400*a* may include receiving a request of determining the performance parameter (e.g., at a PFPS device, e.g. from a radio resource manager), and determining the performance parameter in response to the request.

The method 400*b*, in FIG. 4B, may be an exemplary configuration of the radio resource management method for an exemplary scenario, e.g. an exemplary decision flow of the radio resource management method.

The method 400b may include, in 430, a radio resource manager sending a request of determining a performance parameter of a model of radio resource management to a PFPS device (e.g., the method 400b may include, in 430, a RRM algorithm module sending a request to a PFPSM).

The method 400b may include, in 440, the PFPS device forecasting whether there is a performance benefit in using the model of radio resource management (e.g., a machine learning model). The method 400b may include, in 450, the PFPS device determining whether there is a reasonable (sufficient) benefit in using the model.

If yes, Yes in 450, the method 400b may include, in 460, the PFPS device notifying the radio resource manager to continue the model computation (e.g., the method 400b may include, in 460, the PFPSM notifying the RRM algorithm module that AI/ML computation may be continued).

If no, No in 450, the method 400b may include, in 470, the PFPS device (or the radio resource manager) pushing the model to sleep state, e.g. stopping the computation of the model (e.g., the method 400b may include, in 470, the PFPSM pushing the AI/ML to stop compute/sleep state). The method 400b may then go back to 440 to forecast the performance of another model (or a plurality of other models) of radio resource management.

In the following, various examples are provided that refer to the system 200, radio resource manager202, device 206, 300, and methods 400a, 400b.

Example 1 is a system for use in a wireless network, the system including: a processor configured to determine a performance parameter representative of a performance of a model of radio resource management, the model operating on a radio access network environment; and a radio resource manager configured to perform radio resource management dependent on the performance parameter.

As an example, the performance parameter may be representative of one or more of a throughput, latency, coverage, power consumption, CPU cycles, compute complexity, and/or the like associated with performing radio resource management using an output of the model of radio resource management. Illustratively, the performance of the model of radio resource management may be a performance of the radio access network in terms of one or more communication-based metrics (throughput, latency, coverage, etc.) and/or one or more computation-based metrics (power consumption, CPU cycles, compute complexity, etc.) in the case that radio resource management is performed according to a configuration for radio resource management that the model provides as an output.

Another Example 1 may be a system for use in a wireless network, the system including: a processor configured to determine a performance parameter of a model of radio resource management, the model operating on a radio access network environment, wherein the performance parameter is representative of a forecast (e.g., estimated or predicted) performance of the wireless network in case radio resource management is carried out using the model of radio resource management; and a radio resource manager configured to perform radio resource management dependent on the performance parameter.

In Example 2, the system according to example 1 may optionally further include that the processor is configured to determine the performance parameter of the model of radio resource management based on one or more of: a throughput, a latency, a network coverage, computational cycles for running the model, computational complexity of the model, power consumption of running the model, and/or combinations thereof.

In Example 3, the system according to example 1 or 2 may optionally further include that the radio resource manager is configured to perform radio resource management using the model of radio resource management in case that the performance parameter is in a predefined performance range.

In Example 4, the system according to any one of examples 1 to 3 may optionally further include that at least one of the processor or the radio resource manager is configured to stop an execution of the model in case that the performance parameter is not in a predefined performance range.

In Example 5, the system according to any one of examples 1 to 4 may optionally further include that at least one of the processor or the radio resource manager is configured to discard an output of the model in case that the performance parameter is not in a predefined performance range.

In Example 6, the system according to any one of examples 1 to 5 may optionally further include that the radio resource manager is configured to perform radio resource management using a further model of radio resource management in case that the performance parameter is not in a predefined performance range.

In Example 7, the system according to example 6 may optionally further include that the further model of radio resource management has a lower computational complexity with respect to the model of radio resource management.

In Example 8, the system according to example 6 or 7 may optionally further include that the processor is configured to determine a further performance parameter representative of a further performance of the further model of radio resource management, the further model operating on the radio access network environment.

In Example 9, the system according to example 8 may optionally further include that the radio resource manager is configured to execute the further model of radio resource management in case that the further performance parameter is in the predefined performance range.

In Example 10, the system according to example 8 or 9 may optionally further include that the processor is further configured to compare the performance parameter and the further performance parameter with one another, and that the radio resource manager is configured to perform radio resource management dependent on a result of the comparison.

In Example 11, the system according to any one of examples 8 to 10 may optionally further include that the processor is configured to determine the performance parameter of the model of radio resource management and the further performance parameter of the further model of radio resource management based on a performance of the model and a further performance of the further model over an extended period of time.

In Example 12, the system according to any one of examples 1 to 11 may optionally further include that the processor is configured to determine the performance parameter in accordance with one or more operator preferences representative of at least one of: priority cells for which a respective performance parameter is to be determined, one or more threshold values associated with the predefined performance range, and/or list of models of radio resource management for which a respective performance parameter is to be determined.

In Example 13, the system according to any one of examples 1 to 12 may optionally further include that the model of radio resource management is or includes a machine learning model.

In Example 14, the system according to example 13 may optionally further include that the further model of radio resource management is or includes a further machine learning model, and that the further machine learning model has a lower computational complexity with respect to the machine learning model.

In Example 15, the system according to example 14 may optionally further include that the further machine learning model has a lower number of inputs with respect to the machine learning model.

In Example 16, the system according to example 13 may optionally further include that the further model of radio resource management is or includes a heuristics.

In Example 17, the system according to any one of examples 1 to 16 may optionally further include that the processor is configured to receive a request of determining the performance parameter, and determine the performance parameter in response to the request.

In Example 18, the system according to example 17 may optionally further include that the request includes information representative of at least one of: a class of the model, a regime of the model, a minimum performance requirement for each class of the model, past performance associated with the model, one or more inputs of the model, one or more model parameters of the model, error characteristics and/or error statistics of the model, prediction confidence of the model, and/or a function of error and/or characteristic of the model.

In Example 19, the system according to example 17 or 18 may optionally further include that the processor is configured to provide a result of a determination of the performance parameter in response to the request.

In Example 20, the system according to any one of examples 1 to 19 may optionally further include that the radio access network environment includes one or more of: a cell traffic volume, a cell physical resource block usage, a downlink physical resource block usage, an uplink physical resource block usage, and/or a number of users.

In Example 21, the system according to any one of examples 1 to 20 may optionally further include that the performance parameter is representative of the performance of the model of radio resource management in relation to a cell or a group of cells of the wireless network.

In Example 22, the system according to example 21 may optionally further include that the radio access network environment includes one or more of: a time series evolution of data associated with the cell or group of cells, environmental characteristics associated with the cell or group of cells, and/or a location of the cell or group of cells.

In Example 23, the system according to any one of examples 1 to 22 may optionally further include that the model of radio resource management is configured to output a configuration of radio resource management based on one or more of a user pattern, a traffic pattern, and/or a mobility pattern.

In Example 24, the system according to any one of examples 1 to 23 may optionally further include that the model of radio resource management is a per cell model, and that the model of radio resource management is configured to output a configuration of radio resource management based on a location of the cell and/or a current time of day.

In Example 25, the system according to any one of examples 1 to 24 may optionally further include a radio access network intelligent controller, the radio access network intelligent controller including the processor.

In Example 26, the system according to example 25 may optionally further include that the radio access network intelligent controller is configured as a near-real time radio access network intelligent controller.

In Example 27, the system according to example 25 may optionally further include that the radio access network intelligent controller is configured as a non-real time radio access network intelligent controller.

Example 28 is a method of radio resource management in a wireless network, the method including: determining a performance parameter representative of a performance of a model of radio resource management, the model operating on a radio access network environment; and performing radio resource management dependent on the performance parameter.

Another Example 28 may be a method of radio resource management in a wireless network, the method including: determining a performance parameter of a model of radio resource management, the model operating on a radio access network environment, wherein the performance parameter is representative of a forecast (e.g., estimated or predicted) performance of the wireless network in case radio resource management is carried out using the model of radio resource management; and performing radio resource management dependent on the performance parameter.

In Example 29, the method according to example 28 may optionally further include that determining the performance parameter of the model of radio resource management is based on one or more of: a throughput, a latency, a network coverage, computational cycles for running the model, computational complexity of the model, power consumption of running the model, and/or combinations thereof.

In Example 30, the method according to example 28 or 29 may optionally further include that performing radio resource management dependent on the performance parameter includes performing radio resource management using the model of radio resource management in case that the performance parameter is in a predefined performance range.

In Example 31, the method according to any one of examples 28 to 30, may optionally further include that performing radio resource management dependent on the performance parameter includes stopping an execution of the model in case that the performance parameter is not in a predefined performance range.

In Example 32, the method according to any one of examples 28 to 31, may optionally further include that performing radio resource management dependent on the performance parameter includes discarding an output of the model in case that the performance parameter is not in a predefined performance range.

In Example 33, the method according to any one of examples 28 to 32, may optionally further include that performing radio resource management dependent on the performance parameter includes performing radio resource management using a further model of radio resource management in case that the performance parameter is not in a predefined performance range.

In Example 34, the method according to example 33, may optionally further include that the further model of radio resource management has a lower computational complexity with respect to the model of radio resource management.

In Example 35, the method according to example 33 or 34, may optionally further include determining a further performance parameter representative of a further performance of the further model of radio resource management, the further model operating on the radio access network environment.

In Example 36, the method according to example 35 may optionally further include executing the further model of radio resource management in case that the further performance parameter is in the predefined performance range.

In Example 37, the method according to example 35 or 36 may optionally further include comparing the performance parameter and the further performance parameter with one another, and performing radio resource management dependent on a result of the comparison.

In Example 38, the method according to any one of examples 35 to 37 may optionally further include determining the performance parameter of the model of radio resource management and the further performance parameter of the further model of radio resource management based on a performance of the model and a further performance of the further model over an extended period of time.

In Example 39, the method according to any one of examples 28 to 38 may optionally further include determining the performance parameter in accordance with one or more operator preferences representative of at least one of: priority cells for which a respective performance parameter is to be determined, one or more threshold values associated with the predefined performance range, and/or list of models of radio resource management for which a respective performance parameter is to be determined.

In Example 40, the method according to any one of examples 28 to 39 may optionally further include that the model of radio resource management is or includes a machine learning model.

In Example 41, the method according to example 40 may optionally further include that the further model of radio resource management is or includes a further machine learning model, and that the further machine learning model has a lower computational complexity with respect to the machine learning model.

In Example 42, the method according to example 41 may optionally further include that the further machine learning model has a lower number of inputs with respect to the machine learning model.

In Example 43, the method according to example 40 may optionally further include that the further model of radio resource management is or includes a heuristics.

In Example 44, the method according to any one of examples 28 to 43 may optionally further include receiving a request of determining the performance parameter, and determining the performance parameter in response to the request.

In Example 45, the method according to example 44 may optionally further include that the request includes information representative of at least one of: a class of the model, a regime of the model, a minimum performance requirement for each class of the model, past performance associated with the model, one or more inputs of the model, one or more model parameters of the model, error characteristics and/or error statistics of the model, prediction confidence of the model, and/or a function of error and/or characteristic of the model.

In Example 46, the method according to example 44 or 45 may optionally further include providing a result of a determination of the performance parameter in response to the request.

In Example 47, the method according to any one of examples 28 to 46 may optionally further include that the radio access network environment includes one or more of: a cell traffic volume, a cell physical resource block usage, a downlink physical resource block usage, an uplink physical resource block usage, and/or a number of users.

In Example 48, the method according to any one of examples 28 to 47 may optionally further include that the performance parameter is representative of the performance of the model of radio resource management in relation to a cell or a group of cells of the wireless network.

In Example 49, the method according to example 48 may optionally further include that the radio access network environment includes one or more of: a time series evolution of data associated with the cell or group of cells, environmental characteristics associated with the cell or group of cells, and/or a location of the cell or group of cells.

In Example 50, the method according to any one of examples 28 to 49 may optionally further include that the model of radio resource management is configured to output a configuration of radio resource management based on one or more of a user pattern, a traffic pattern, and/or a mobility pattern.

In Example 51, the method according to any one of examples 28 to 50 may optionally further include that the model of radio resource management is a per cell model, and that the model of radio resource management is configured to output a configuration of radio resource management based on a location of the cell and/or a current time of day.

Example 52 is a non-transitory computer readable medium including instructions which, when the instructions are executed by a computer, cause the computer to carry out the method of any one of examples 28 to 51.

Example 53 is a computer program product including instructions which, when the program is executed by a computer, cause the computer to carry out the method of any one of examples 28 to 51. As an example, the computer program product may be a xAPP for a near-real time RIC or non-real time RIC.

Example 54 is a device for use in a wireless network, the device including: a processor configured to: determine a performance parameter representative of a performance of a model of radio resource management, the model operating on a radio access network environment; and instruct a radio resource management dependent on the performance parameter. In an exemplary configuration the device may further include a memory coupled with the processor, the memory storing instructions and/or data for the processor, such as the performance parameter, the model, and/or the like.

Another Example 54 may be a device for use in a wireless network, the device including: a processor configured to: determine a performance parameter of a model of radio resource management, the model operating on a radio access network environment, wherein the performance parameter is representative of a forecast (e.g., estimated or predicted) performance of the wireless network in case radio resource management is carried out using the model of radio resource management; and instruct a radio resource management dependent on the performance parameter.

Example 55 is a radio resource manager for use in a wireless network, the radio resource manager including: a processor configured to: receive an instruction associated with a performance parameter representative of a performance of the model of radio resource management, the model operating on a radio access network environment; and perform radio resource management dependent on the performance parameter. In an exemplary configuration the radio resource manager may further include a memory coupled with the processor, the memory storing instructions and/or data for the processor, such as the performance parameter, the model (one or more models), and/or the like.

Another Example 55 is a radio resource manager for use in a wireless network, the radio resource manager including:

a processor configured to: receive an instruction associated with a performance parameter of a model of radio resource management, the model operating on a radio access network environment, wherein the performance parameter is representative of a forecast (e.g., estimated or predicted) performance of the wireless network in case radio resource management is carried out using the model of radio resource management; and perform radio resource management dependent on the performance parameter.

Example 56 is a method of radio resource management in a wireless network, the method including: determining a performance parameter representative of a performance of a model of radio resource management, the model operating on a radio access network environment; and instructing radio resource management dependent on the performance parameter.

Example 57 is a method of radio resource management in a wireless network, the method including: forecasting a performance of a model of radio resource management, the model operating on a radio access network environment; and instructing radio resource management dependent on the forecast performance.

Example 58 is a method of radio resource management in a wireless network, the method including: receiving an instruction including a performance parameter representative of a performance of a model of radio resource management, the model operating on a radio access network environment; and performing radio resource management dependent on the received instruction (illustratively, dependent on the received performance parameter).

Example 59 is a system for use in a wireless network, the system including: processing means for determining a performance parameter representative of a performance of a model of radio resource management, the model operating on a radio access network environment; and a resource managing means for performing radio resource management dependent on the performance parameter.

The term "data" as used herein, for example in relation to "input data" or "output data", may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The term "processor" as used herein may be understood as any kind of technological entity that allows handling of data. The data may be handled according to one or more specific functions that the processor may execute. Further, a processor as used herein may be understood as any kind of circuit, e.g., any kind of analog or digital circuit. A processor may thus be or include an analog circuit, digital circuit, mixed-signal circuit, logic circuit (e.g., a hard-wired logic circuit or a programmable logic circuit), microprocessor (for example a Complex Instruction Set Computer (CISC) processor or a Reduced Instruction Set Computer (RISC) processor), Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. A "processor" may also be a logic-implementing entity executing software, for example any kind of computer program, for example a computer program using a virtual machine code such as for example Java. A "processor" as used herein may also include any kind of cloud-based processing system that allows handling of data in a distributed manner, e.g. with a plurality of logic-implementing entities communicatively coupled with one another (e.g. over the internet) and each assigned to handling the data or part of the data. By way of illustration, an application running on a server and the server can also be a "processor". Any other kind of implementation of the respective functions, which will be described below in further detail, may also be understood as a processor. It is understood that any two (or more) of the processors detailed herein may be realized as a single entity with equivalent functionality or the like, and conversely that any single processor detailed herein may be realized as two (or more) separate entities with equivalent functionality or the like.

The term "system" detailed herein may be understood as a set of interacting elements, the elements may be, by way of example and not of limitation, one or more physical components (e.g., processors, transmitters and/or receivers) and/or one or more digital components (e.g., code segments, instructions, protocols). Generally, the system may include one or more functions to be operated (also referred to as "operating functions") of which each may be controlled for operating the whole system.

The term "memory" as used herein may be understood as a computer-readable medium (e.g., a non-transitory computer-readable medium), in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Furthermore, it is appreciated that registers, shift registers, processor registers, data buffers, among others, are also embraced herein by the term memory. It is also appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "software" refers to any type of executable instruction, including firmware.

As used herein, a "cell" in the context of telecommunications may be understood as a sector served by a network access node. A wireless network may be distributed over a plurality of cells. Accordingly, a cell may be a set of geographically co-located antennas that correspond to a particular sector of a network access node. A network access node can thus serve one or more cells (or sectors), where the cells are characterized by distinct communication channels. Furthermore, the term "cell" may be utilized to refer to any of a macro cell, micro cell, femto cell, pico cell, etc. An "inter-cell handover" may be understood as a handover from a first "cell" to a second "cell", where the first "cell" is different from the second "cell". "Inter-cell handovers" may be characterized as either "inter-network access node handovers" or "intra-network access node handovers". "Inter-network access node handovers" may be understood as a handover from a first "cell" to a second "cell", where the first "cell" is provided at a first network access node and the second "cell" is provided at a second, different, network access node. "Intra-network access node handovers" may be understood as a handover from a first "cell" to a second "cell", where the first "cell" is provided at the same network access node as the second "cell". A "serving cell" may be understood as a "cell" that a wireless communication device is currently connected to according to the mobile communications protocols of the associated mobile communications network standard. In case a cell is served by a mobile network access node, the cell itself may be non-stationary, e.g. may be a mobile cell.

The present disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the examples described herein. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Exemplary Cellular Wide Area radio communication technologies that the present disclosure may utilize include, but are not limited to: Long Term Evolution (LTE), Long Term Evolution-Advanced (LTE-A), 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSDPA Plus (HSDPA+), HSUPA (High-Speed Uplink Packet Access), HSUPA Plus (HSUPA+), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Zigbee, Bluetooth®, Wireless Gigabit Alliance (WiGig) standard, Worldwide Interoperability for Microwave Access (WiMax) (e.g., according to an IEEE 802.16 radio communication standard, e.g., WiMax fixed or WiMax mobile), mmWave standards in general (wireless systems operating at 10-90 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication arrangements such as Intelligent-Transport-Systems, etc. Cellular Wide Area radio communication technologies also include "small cells" of such technologies, such as microcells, femtocells, and picocells. Cellular Wide Area radio communication technologies may be generally referred to herein as "cellular" communication technologies. As used herein, a first radio communication technology may be different from a second radio communication technology if the first and second radio communication technologies are based on different communication standards.

The term "5G" as used herein refers to wireless technologies as provided by the 3GPP and International Telecommunication Union (ITU) standards. This may include spectral use overlapping with the existing LTE frequency range (e.g., 600 MHz to 6 GHZ) and also include spectral use in the millimeter wave bands (e.g., 24-86 GHz). Also, the terms 5G, New Radio (NR), or 5G NR may be used interchangeably. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum.

The present disclosure may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHZ, 3.6-3.8 GHz and further frequencies and SAS, "Spectrum Access System," in 3.55-3.7 GHz and further frequencies), and may use various spectrum bands including, but not limited to, IMT (International Mobile Telecommunications) spectrum (including 450-470 MHz, 790-960 MHz, 1710-2025 MHz, 2110-2200 MHZ, 2300-2400 MHZ, 2500-2690 MHz, 698-790 MHz, 610-790 MHz, 3400-3600 MHZ, etc., where some bands may be limited to specific region(s) and/or countries), IMT-advanced spectrum, IMT-2020 spectrum (expected to include 3600-3800 MHZ, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHZ, 57-64 GHz, 64-71 GHz, 71-76 GHZ, 81-86 GHz and 92-94 GHZ, etc.), the ITS (Intelligent Transport Systems) band of 5.9 GHz (typically 5.85-5.925 GHZ) and 63-64 GHz, bands currently allocated to WiGig such as WiGig Band 1 (57.24-59.40 GHz), WiGig Band 2 (59.40-61.56 GHZ) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, aspects described herein can also employ radio communication technologies on a secondary basis on bands such as the TV White Space bands (typically below 790 MHZ) where in particular the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. Aspects described herein can also use radio communication technologies with different Single Carrier or OFDM flavors (CP-OFDM, SC-FDMA, SC-OFDM, filter bank-based multicarrier (FBMC), OFDMA, etc.) and in particular 3GPP NR (New Radio), which can include allocating the OFDM carrier data bit vectors to the corresponding symbol resources.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor may transmit or receive data over a software-level connection with another processor in the form of radio signals, where radio-layer components carry out the physical transmission and reception, such as radio frequency (RF) transceivers and antennas, and the processors perform the logical transmission and reception over the software-level connection.

The term "communicate" encompasses one or both of transmitting and receiving, i.e., unidirectional or bidirectional communication in one or both of the incoming and outgoing directions. In general, the term "communicate" may include the exchange of data, e.g., unidirectional or bidirectional exchange in one or both of the incoming and outgoing directions.

The term "calculate" encompasses both 'direct' calculations via a mathematical expression/formula/relationship and 'indirect' calculations via lookup or hash tables and other array indexing or searching operations.

As utilized herein, the term "derived from" designates being obtained directly or indirectly from a specific source. Accordingly, data derived from a source includes data obtained directly from the source or indirectly from the source, i.e. through one or more secondary agents.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. For instance, the phrase "a plurality" may be understood to include a numerical quantity greater than or equal to two (e.g., two, three, four, five, [ . . . ], etc.). The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]", "three of the [objects]", "ten or more [objects]", "at least four [objects]", etc.) or express use of the words "plural", "multiple", or similar phrases, references to quantities of objects are intended to refer to one or more of said objects.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

As used herein, a signal (e.g., data) that is "indicative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes, which come within the meaning and range of equivalency of the claims, are therefore intended to be embraced.

What is claimed is:

1. A system for use in a wireless network, the system comprising:
a processor configured to:
determine a performance parameter based on at least one of: a throughput, a latency, a network coverage, computational cycles for running the model, computational complexity of the model, power consumption of running the model, and/or combinations thereof, the performance parameter being representative of a performance of a model of radio resource management, the model operating on a radio access network environment;
determine a further performance parameter representative of a further performance of a further model of radio resource management, the further model operating on the radio access network environment; and
compare the performance parameter and the further performance parameter with one another; and
a radio resource manager configured to perform radio resource management dependent on a result of the comparison of the performance parameter and the further performance parameter with one another in case that the performance parameter is in a predefined performance range.

2. The system according to claim 1,
wherein at least one of the processor or the radio resource manager is configured to stop an execution of the model in case that the performance parameter is not in a predefined performance range.

3. The system according to claim 1,
wherein the radio resource manager is configured to perform radio resource management using the further model of radio resource management in case that the performance parameter is not in a predefined performance range.

4. The system according to claim 1,
wherein the further model of radio resource management has a lower computational complexity with respect to the model of radio resource management.

5. The system according to claim 3,
wherein the radio resource manager is configured to execute the further model of radio resource management in case that the further performance parameter is in the predefined performance range.

6. The system according to claim 1,
wherein the processor is configured to determine the performance parameter of the model of radio resource management and the further performance parameter of the further model of radio resource management based on a performance of the model and a further performance of the further model over an extended period of time.

7. The system according to claim 1,
wherein the model of radio resource management is or comprises a machine learning model.

8. The system according to claim 3,
wherein the further model of radio resource management is or comprises a further machine learning model, and
wherein the further machine learning model has a lower computational complexity with respect to the machine learning model.

9. The system according to claim 3,
wherein the further model of radio resource management is or comprises a heuristics.

10. The system according to claim 1,
wherein the processor is configured to receive a request of determining the performance parameter, and determine the performance parameter in response to the request.

11. The system according to claim 10,
wherein the request comprises information representative of at least one of: a class of the model, a regime of the model, a minimum performance requirement for each class of the model, past performance associated with the model, one or more inputs of the model, one or more model parameters of the model, error characteristics and/or error statistics of the model, prediction confidence of the model, and/or a function of error and/or characteristic of the model.

12. The system according to claim 1,
wherein the radio access network environment comprises at least one of: a cell traffic volume, a cell physical resource block usage, a downlink physical resource block usage, an uplink physical resource block usage, and/or a number of users.

13. A device for use in a wireless network, the device comprising:
 a processor configured to:
  determine a performance parameter based on at least one of: a throughput, a latency, a network coverage, computational cycles for running the model, computational complexity of the model, power consumption of running the model, and/or combinations thereof, the performance parameter being representative of a performance of a model of radio resource management, the model operating on a radio access network environment;
  determine a further performance parameter representative of a further performance of a further model of radio resource management, the further model operating on the radio access network environment;
  compare the performance parameter and the further performance parameter with one another; and
  instruct a radio resource management dependent on a result of the comparison of the performance parameter and the further performance parameter with one another in case that the performance parameter is in a predefined performance range.

14. The device according to claim 13,
 wherein the processor is configured to determine the performance parameter of the model of radio resource management based on one or more of: a throughput, a latency, a network coverage, computational cycles for running the model, computational complexity of the model, power consumption of running the model, and/or combinations thereof.

15. A radio resource manager for use in a wireless network, the radio resource manager comprising:
 a processor configured to:
  receive an instruction associated with a result of a comparison of a performance parameter and a further performance parameter with one another,
  wherein the performance parameter is representative of a performance of a model of radio resource management, the model operating on a radio access network environment,
  wherein the further performance parameter is based on at least one of: a throughput, a latency, a network coverage, computational cycles for running the model, computational complexity of the model, power consumption of running the model, and/or combinations thereof, the performance parameter being representative of a further performance of a further model of radio resource management, the further model operating on the radio access network environment; and
  perform radio resource management dependent on the result of the comparison of the performance parameter and the further performance parameter with one another in case that the performance parameter is in a predefined performance range.

16. The device according to claim 15,
 wherein the radio resource manager is configured to perform radio resource management using the further model of radio resource management in case that the performance parameter is not in a predefined performance range.

* * * * *